United States Patent
Nakazaki

(10) Patent No.: US 11,872,848 B2
(45) Date of Patent: Jan. 16, 2024

(54) PNEUMATIC TIRE

(71) Applicant: The Yokohama Rubber Co., LTD., Tokyo (JP)

(72) Inventor: Keisuke Nakazaki, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 441 days.

(21) Appl. No.: 16/969,953

(22) PCT Filed: Jan. 7, 2019

(86) PCT No.: PCT/JP2019/000104
§ 371 (c)(1),
(2) Date: Aug. 13, 2020

(87) PCT Pub. No.: WO2019/159564
PCT Pub. Date: Aug. 22, 2019

(65) Prior Publication Data
US 2021/0008928 A1   Jan. 14, 2021

(30) Foreign Application Priority Data

Feb. 14, 2018   (JP) .................................. 2018-024573

(51) Int. Cl.
*B60C 11/13*   (2006.01)
*B60C 11/03*   (2006.01)
*B60C 11/12*   (2006.01)

(52) U.S. Cl.
CPC ...... *B60C 11/1392* (2013.01); *B60C 11/0304* (2013.01); *B60C 11/1204* (2013.01);
(Continued)

(58) Field of Classification Search
CPC ............ B60C 11/0304; B60C 11/1392; B60C 2011/0383; B60C 2011/039; B60C 2011/0395; B60C 2011/0348
See application file for complete search history.

(56) References Cited

U.S. PATENT DOCUMENTS 8,573,269 B2   11/2013   Mita
9,216,618 B2   12/2015   Suga
(Continued)

FOREIGN PATENT DOCUMENTS

CN   101890881   11/2010
CN   103241070   8/2013
(Continued)

OTHER PUBLICATIONS

English machine translation of JP2016-074256. (Year: 2016).*
International Search Report for International Application No. PCT/JP2019/000104 dated Apr. 9, 2019, 4 pages, Japan.

*Primary Examiner* — Robert C Dye
(74) *Attorney, Agent, or Firm* — Thorpe North & Western

(57) ABSTRACT

In a pneumatic tire, a groove opening portion of an inner side shoulder main groove and a groove opening portion of an inner side center main groove have edge portions with a straight shape. A groove opening portion of an outer side center main groove has an edge portion chamfered in a zigzag shape. A groove width Wg1 of the inner side shoulder main groove, a groove width Wg2 of the inner side center main groove, and a groove width Wg3 of the outer side center main groove have a relationship Wg1<Wg3 and Wg2<Wg3.

15 Claims, 16 Drawing Sheets

(52) U.S. Cl.
CPC . *B60C 2011/036* (2013.01); *B60C 2011/0348* (2013.01); *B60C 2011/0365* (2013.01); *B60C 2011/0367* (2013.01); *B60C 2011/0381* (2013.01); *B60C 2011/0383* (2013.01); *B60C 2011/0388* (2013.01)

(56) References Cited

U.S. PATENT DOCUMENTS

| | | | |
|---|---|---|---|
| 10,647,161 B2 | 5/2020 | Shibai | |
| 11,090,981 B2 | 8/2021 | Speziari et al. | |
| 2010/0212792 A1* | 8/2010 | Mita | B60C 11/033 152/209.9 |
| 2013/0186532 A1* | 7/2013 | Kujime | B60C 11/033 152/209.8 |
| 2013/0199684 A1 | 8/2013 | Sakamoto | |
| 2014/0137999 A1* | 5/2014 | Nishiwaki | B60C 11/03 152/209.8 |
| 2015/0075686 A1* | 3/2015 | Suga | B60C 11/04 152/209.16 |
| 2016/0009141 A1* | 1/2016 | Suga | B60C 11/04 152/209.9 |
| 2018/0086147 A1 | 3/2018 | Morii | |
| 2018/0207991 A1 | 7/2018 | Shibai | |

FOREIGN PATENT DOCUMENTS

| | | |
|---|---|---|
| CN | 104203601 | 12/2014 |
| CN | 107635795 | 1/2018 |
| JP | 2013-177114 | 9/2013 |
| JP | 5413500 | 2/2014 |
| JP | 2014205420 | * 10/2014 |
| JP | 2016-074256 | 5/2016 |
| JP | 2016-113003 | 6/2016 |
| JP | 2017-030556 | 2/2017 |
| JP | 2017-074841 | 4/2017 |
| JP | 2017-088114 | 5/2017 |
| WO | WO 2013/141261 | 9/2013 |
| WO | WO 2014/167990 | 10/2014 |
| WO | WO 2016/167122 | 10/2016 |
| WO | WO 2017/022308 | 2/2017 |
| WO | WO 2017/115195 | 7/2017 |

* cited by examiner

|  | Conventional Example | Comparative Example | Example 1 | Example 2 |
|---|---|---|---|---|
| Shape of outer side center main groove | Straight | Zigzag | Zigzag | Zigzag |
| Wg1 (mm) | 12.6 | 12.6 | 9.8 | 12.6 |
| Wg2 (mm) | 12.6 | 12.6 | 9.8 | 12.6 |
| Wg3 (mm) | 12.6 | 12.6 | 14.0 | 14.0 |
| Wg4 (mm) | 5.8 | 12.6 | 5.8 | 5.8 |
| Wg1/Wg3 | 1.00 | 1.00 | 0.70 | 0.90 |
| Wg2/Wg3 | 1.00 | 1.00 | 0.70 | 0.90 |
| Wg4/Wg3 | 0.46 | 1.00 | 0.41 | 0.41 |
| Dg1 (mm) | 45.2 | 45.2 | 45.2 | 45.2 |
| Dg2 (mm) | 16.5 | 16.5 | 16.5 | 16.5 |
| Dg3 (mm) | 16.5 | 16.5 | 16.5 | 16.5 |
| Dg4 (mm) | 45.2 | 45.2 | 45.2 | 45.2 |
| Hc/Hg3 | - | 0.60 | 0.60 | 0.60 |
| Bent portion of bent lug groove | No | Yes | No | No |
| Dry steering stability performance | 100 | 95 | 103 | 102 |
| Wet steering stability performance | 100 | 104 | 104 | 106 |
| Uneven wear resistance performance | 100 | 97 | 100 | 100 |

FIG. 15A

| | Example 3 | Example 4 | Example 5 | Example 6 | Example 7 | Example 8 |
|---|---|---|---|---|---|---|
| Shape of outer side center main groove | Zigzag | Zigzag | Zigzag | Zigzag | Zigzag | Zigzag |
| Wg1 (mm) | 9.8 | 9.8 | 9.8 | 9.8 | 9.8 | 9.8 |
| Wg2 (mm) | 12.6 | 12.6 | 12.6 | 12.6 | 12.6 | 12.6 |
| Wg3 (mm) | 14.0 | 14.0 | 14.0 | 14.0 | 14.0 | 14.0 |
| Wg4 (mm) | 5.8 | 3.5 | 3.5 | 3.5 | 3.5 | 3.5 |
| Wg1/Wg3 | 0.70 | 0.70 | 0.70 | 0.70 | 0.70 | 0.70 |
| Wg2/Wg3 | 0.90 | 0.90 | 0.90 | 0.90 | 0.90 | 0.90 |
| Wg4/Wg3 | 0.41 | 0.25 | 0.25 | 0.25 | 0.25 | 0.25 |
| Dg1 (mm) | 45.2 | 45.2 | 45.2 | 45.2 | 45.2 | 45.2 |
| Dg2 (mm) | 16.5 | 16.5 | 24.7 | 16.5 | 16.5 | 16.5 |
| Dg3 (mm) | 16.5 | 16.5 | 24.7 | 24.7 | 16.5 | 16.5 |
| Dg4 (mm) | 45.2 | 45.2 | 45.2 | 45.2 | 45.2 | 45.2 |
| Hc/Hg3 | 0.60 | 0.60 | 0.60 | 0.60 | 0.50 | 0.50 |
| Bent portion of bent lug groove | No | No | No | No | No | Yes |
| Dry steering stability performance | 103 | 104 | 102 | 102 | 106 | 107 |
| Wet steering stability performance | 105 | 104 | 105 | 105 | 105 | 106 |
| Uneven wear resistance performance | 100 | 100 | 100 | 100 | 104 | 105 |

FIG. 15B

PNEUMATIC TIRE

TECHNICAL FIELD

The present technology relates to a pneumatic tire and particularly relates to a pneumatic tire that can provide dry performance and wet performance of the tire in a compatible manner.

BACKGROUND ART

Recent pneumatic tires have been demanded that steering stability performance on dry road surfaces and steering stability performance on wet road surfaces should be provided in a compatible manner. As conventional pneumatic tires that address this need, technologies described in Japan Unexamined Patent Publication No. 2017-030556 and Japan Patent No. 5413500 have been known.

SUMMARY

The present technology provides a pneumatic tire that can provide dry performance and wet performance of the tire in a compatible manner.

A pneumatic tire according to an embodiment of the technology includes a mounting direction indicator, an inner side shoulder main groove and an inner side center main groove, an outer side center main groove, a circumferential narrow groove, and five rows of land portions. The mounting direction indicator indicates a mounting direction of the tire to a vehicle. The inner side shoulder main groove and the inner side center main groove are formed in a region inward in a vehicle width direction demarcated by a tire equatorial plane and extend in a tire circumferential direction. The outer side center main groove is formed in a region outward in the vehicle width direction and extends in the tire circumferential direction. The circumferential narrow groove is formed outward than the outer side center main groove in a tire lateral direction and extends in the tire circumferential direction. The five rows of land portions are formed by being defined by the four grooves. A groove opening portion of the inner side shoulder main groove and the groove opening portion of the inner side center main groove have edge portions with a straight shape. The groove opening portion of the outer side center main groove has an edge portion chamfered in a zigzag shape. A groove width $Wg1$ of the inner side shoulder main groove, a groove width $Wg2$ of the inner side center main groove, and a groove width $Wg3$ of the outer side center main groove have a relationship $Wg1<Wg3$ and $Wg2<Wg3$.

With the pneumatic tire according to an embodiment of the technology, (1) the two main grooves are disposed in the region inward in the vehicle width direction, and one main groove and one circumferential narrow groove are disposed in the region outward in the vehicle width direction. Accordingly, drainage properties of the region inward in the vehicle width direction having a high degree of contribution to wet performance is ensured and rigidity of the region outward in the vehicle width direction having a high degree of contribution to dry performance is ensured at the same time. Additionally, (2) the two main grooves in the region inward in the vehicle width direction have the straight shape. Meanwhile, the main groove in the region outward in the vehicle width direction includes zigzag-shaped chamfered portions. Thus, a groove volume of the main groove in the region outward in the vehicle width direction is relatively enlarged. This ensures the groove volume in the region outward in the vehicle width direction and ensures the wet performance of the tire. Additionally, (3) since the groove width $Wg3$ of the main groove in the region outward in the vehicle width direction is larger than the groove widths $Wg1$, $Wg2$ of the two main grooves in the region inward in the vehicle width direction. This ensures the groove volume in the region outward in the vehicle width direction and ensures the wet performance of the tire. Accordingly, there is an advantage that the wet performance and the dry performance of the tire are appropriately provided in a compatible manner.

BRIEF DESCRIPTION OF DRAWINGS

FIGS. 15A-15B include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
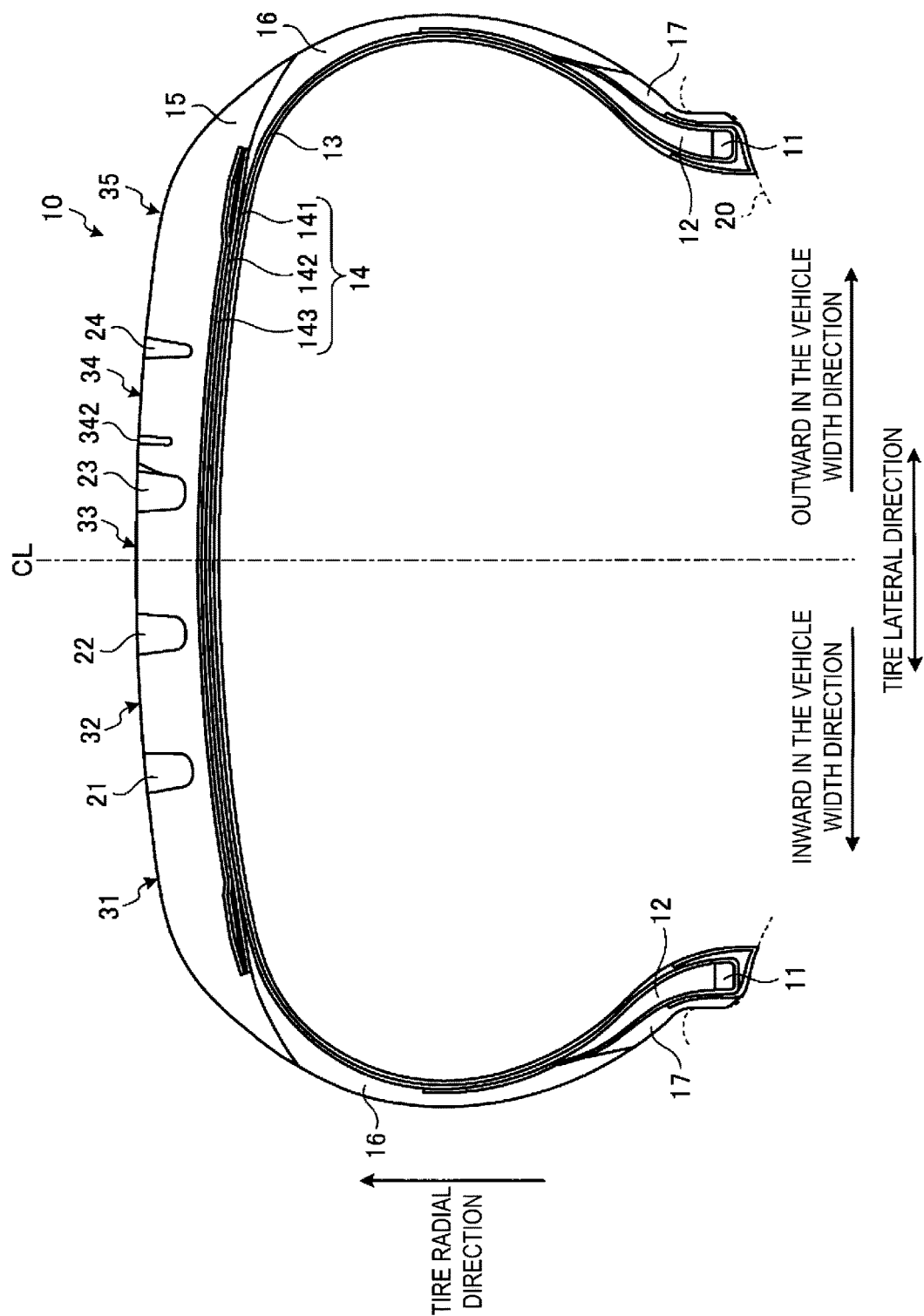
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

Furthermore, inward in the vehicle width direction and outward in the vehicle width direction are defined as directions to the vehicle width direction when the tire is mounted on a vehicle. Additionally, left and right regions demarcated by the tire equatorial plane are defined as a region outward in the vehicle width direction and a region inward in the vehicle width direction, respectively. The pneumatic tire includes a mounting direction indicator (not illustrated) that indicates a tire mounting direction to a vehicle. The mounting direction indicator, for example, is constituted by a mark or ridges/grooves on the sidewall portion of the tire. For example, Economic Commission for Europe Regulation 30 (ECE R30) requires that a vehicle mounting direction indicator is provided on the sidewall portion outward in the vehicle width direction when the tire is mounted on a vehicle.

A pneumatic tire 10 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1). Note that reference sign 20 in FIG. 1 is a rim of a wheel.

The pair of bead cores 11, 11 are formed by annularly and multiply winding one or a plurality of bead wires made of steel, and are embedded in bead portions to constitute cores of the right and left bead portions. The pair of bead fillers 12, 12 are disposed outward of the pair of bead cores 11, 11 in the tire radial direction and reinforce the bead portions.

The carcass layer 13 has a single layer structure made of one carcass ply or a multilayer structure made of a plurality of layered carcass plies, and extends between the right and left bead cores 11, 11 in a toroidal shape, forming the framework of the tire. Additionally, both end portions of the carcass layer 13 are turned back outwardly in the tire lateral direction so as to wrap around the bead cores 11 and the bead fillers 12 and fixed. The carcass ply (plies) of the carcass layer 13 is made by performing a rolling process on coating rubber-covered carcass cords made of steel or an organic fiber material (e.g. aramid, nylon, polyester, rayon, or the like). The carcass ply (plies) has a carcass angle (defined as the inclination angle of the longitudinal direction of the carcass cords with respect to the tire circumferential direction), as an absolute value, ranging from 80 degrees to 95 degrees.

The belt layer 14 is a multilayer structure including a pair of cross belts 141, 142 and a belt cover 143 and is disposed around the outer circumference of the carcass layer 13. The pair of cross belts 141, 142 are made by performing a rolling process on coating rubber-covered belt cords made of steel or an organic fiber material. The cross belts 141, 142 have a belt angle, as an absolute value, ranging from 20 degrees to 55 degrees. Furthermore, the pair of cross belts 141, 142 have belt angles (defined as an inclination angle of the longitudinal direction of the belt cords with respect to the tire circumferential direction) of opposite signs, and the belts are layered so that the longitudinal directions of the belt cords meet each other (so-called crossply structure). Additionally, the belt cover 143 is made by coating belt cords made of steel or an organic fiber material with a coating rubber. The belt cover 143 has a belt angle, as an absolute value, ranging from 0 degrees to 10 degrees. Further, the belt cover 143 is, for example, a strip material formed by coating one or more belt cords with a coating rubber and winding the strip material spirally around the outer circumferential surface of the cross belts 141, 142 multiple times in the tire circumferential direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are each disposed inward of the right and left bead cores 11, 11 and the turned back portions of the carcass layer 13 in the tire radial direction to constitute the rim fitting surfaces of the bead portions.

Tread Pattern

Figure 2:
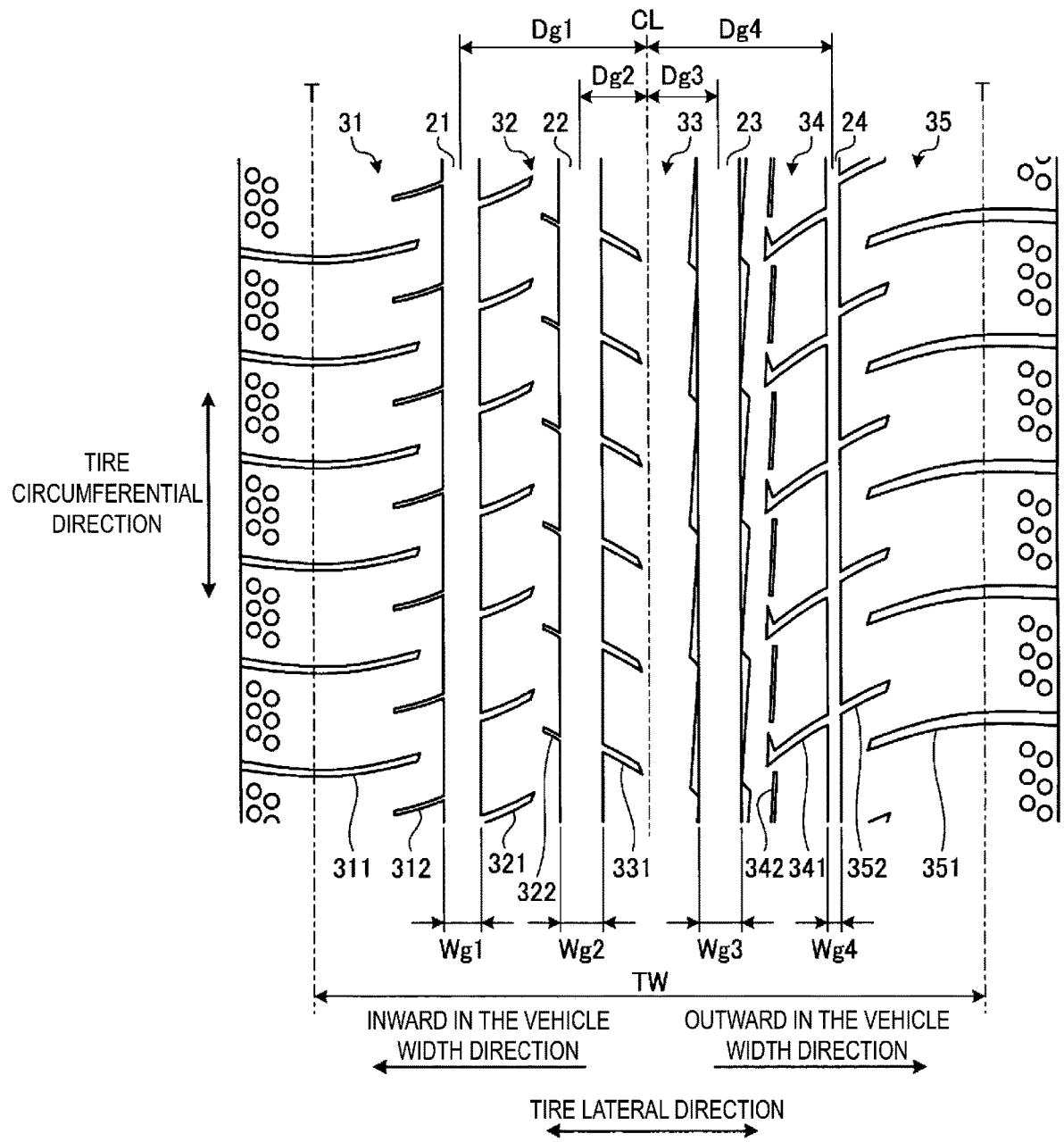
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread pattern for an all-season tire. In reference to the same drawing, "tire circumferential direction" refers to the direction revolving about the tire rotation axis. Reference sign T denotes a tire ground contact edge, and a dimension symbol denotes a tire ground contact width.

As illustrated in FIG. 2, the pneumatic tire 10 includes, in the tread surface, a plurality of circumferential grooves 21 to 24 extending in the tire circumferential direction and a plurality of land portions 31 to 35 defined by the circumferential grooves 21 to 24.

"Main groove" refers to a groove on which a wear indicator must be provided as specified by JATMA (The Japan Automobile Tyre Manufacturers Association, Inc.). Lug grooves described later are lateral grooves extending in the tire lateral direction and open when the tire comes into contact with the ground to function as grooves. A sipe described later is a cut formed in a road contact surface of a tread and closes when the tire comes into contact with the ground.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove widths are measured with intersection points where the tread contact surface and extension lines of the groove walls meet as measurement points, in a cross-sectional view normal to the groove length direction. Additionally, in a configuration in which the grooves extend in a zigzag-like or wave-like manner in the tire circumferential direction, the groove width is measured with the center line of amplitude of the groove walls as the measurement point.

The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, for a passenger vehicle tire, the specified internal pressure is an air pressure of 180 kPa, and the specified load is 88% of the maximum load capacity at the specified internal pressure.

For example, in the configuration of FIG. 2, the pneumatic tire 10 has a left-right symmetric tread pattern with respect to a tire equatorial plane CL. Additionally, a region inward in the vehicle width direction demarcated by the tire equatorial plane CL includes two circumferential main grooves 21, 22 and a region outward in the vehicle width direction includes one circumferential main groove 23 and one circumferential narrow groove 24. These circumferential grooves 21 to 24 are disposed being left-right symmetric with respect to the tire equatorial plane CL. Five rows of the land portions 31 to 35 are defined by the circumferential grooves 21 to 24. In addition, one land portion 33 is disposed on the tire equatorial plane CL. Here, among the two circumferential main grooves 21, 22 in the region inward in the vehicle width direction, the circumferential main groove 21 on a tire ground contact edge T side is referred to as an inner side shoulder main groove. Also, the circumferential main groove 23 on the tire equatorial plane CL side is referred to as an outer side center main groove.

A groove width Wg1 of the inner side shoulder main groove 21, a groove width Wg2 of the inner side center main groove 22, and a groove width Wg3 of the outer side center main groove 23 have a relationship Wg1<Wg3 and Wg2<Wg3, and preferably have a relationship Wg1<Wg2<Wg3. Specifically, the groove widths Wg1, Wg2, and Wg3 have a relationship 0.70<Wg1/Wg3≤0.90 and 0.70≤Wg2/Wg3≤0.90. Additionally, the groove width Wg3 of the widest outer side center main groove 23 is in the range 10.0 mm≤Wg3≤14.0 mm. Groove depths Hg1 to Hg3 of the main grooves 21 to 23 are in the range of from 6.0 mm or more to 9.0 mm or less.

Additionally, a groove width Wg4 of the circumferential narrow groove 24 is narrower than the groove widths Wg1 to Wg3 of the main grooves 21 to 23 and in the range 1.5 mm≤Wg4≤4.0 mm. The groove width Wg4 of the circumferential narrow groove 24 is in the range 0.10≤Wg4/Wg3≤0.35 to the groove width Wg3 of the outer side center main groove 23. Additionally, a groove depth Hg4 of the circumferential narrow groove 24 is in the range 5.0 mm≤Hg4≤7.5 mm. Note that when the groove width Wg4 and the groove depth Hg4 of the circumferential narrow groove 24 are in the ranges 3.0 mm≤Wg4 and 6.7 mm≤Hg4, the circumferential narrow groove 24 may be treated as a main groove to form a wear indicator.

In the configuration described above, (1) the two main grooves 21, 22 are disposed in the region inward in the vehicle width direction, and the one main groove 23 and the one circumferential narrow groove 24 are disposed in the region outward in the vehicle width direction. Accordingly, drainage properties of the region inward in the vehicle width direction having high degree of contribution to wet performance is ensured and rigidity of the region outward in the vehicle width direction having high degree of contribution to dry performance is ensured at the same time. Additionally, (2) the two main grooves 21, 22 in the region inward in the vehicle width direction have a straight shape. Meanwhile, the main groove 23 in the region outward in the vehicle width direction includes zigzag-shaped chamfered portions 332, 343 (see FIGS. 6 and 9). Thus, a groove volume of the main groove 23 in the region outward in the vehicle width direction is relatively enlarged. This ensures the groove volume in the region outward in the vehicle width direction and ensures the wet performance of the tire. Additionally, (3) since the groove width Wg3 of the main groove 23 in the region outward in the vehicle width direction is larger than the groove widths Wg1, Wg2 of the two main grooves 21, 22 in the region inward in the vehicle width direction. This ensures the groove volume in the region outward in the vehicle width direction and ensures the wet performance of the tire. Accordingly, there is an advantage that the wet performance and the dry performance of the tire are appropriately provided in a compatible manner.

In FIG. 2, a distance Dg1 from the tire equatorial plane CL to the inner side shoulder main groove 21, a distance Dg2 from the tire equatorial plane CL to the inner side center main groove 22, and a distance Dg3 from the tire equatorial plane CL to the outer side center main groove 23 have a relationship 0.26≤Dg1/TW≤0.33, 0.10≤Dg2/TW≤0.15, and 0.10≤Dg3/TW≤0.15 to the tire ground contact width TW. A distance Dg4 from the tire equatorial plane CL to the circumferential narrow groove 24 has the relationship 0.26≤Dg4/TW≤0.33 to the tire ground contact width TW.

The distances Dg1 to Dg3 of the main grooves are measured as distances from the tire equatorial plane to groove center lines of the main grooves when the tire is mounted on a specified rim, inflated to the specified internal pressure, and in an unloaded state.

The groove center line of the circumferential main groove is defined as a straight line passing through the midpoint of right and left measurement points of the groove width of the circumferential main groove and parallel to the tire circumferential direction.

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

In addition, a region on the tire equatorial plane CL side demarcated by the shoulder main groove 21 and the circumferential narrow groove 24 is referred to as a center region and right and left regions on the tire ground contact edge T side are referred to as shoulder regions.

Moreover, the land portions 31, 35 located outward in the tire lateral direction that are defined by the shoulder main groove 21 and the circumferential narrow groove 24 are defined as shoulder land portions. The shoulder land portions 31, 35 are disposed on the most outward in the tire lateral direction and located on the tire ground contact edges T. In addition, the shoulder land portion 31, which is disposed in the region inward in the vehicle width direction, is defined as an inner shoulder land portion, and the shoulder land portion 35, which is disposed in the region outward in the vehicle width direction, is defined as an outer shoulder land portion.

Furthermore, the land portions 32, 34 inward in the tire lateral direction defined by the shoulder main groove 21 and the circumferential narrow groove 24 are defined as second land portions. Accordingly, the second land portions 32, 34 are adjacent to the shoulder land portions 31, 35 with the shoulder main grooves 21, 24 disposed therebetween. Also, the second land portion 32 in the region inward in the vehicle width direction is defined as an inner second land portion, and the second land portion 34 in the region outward in the vehicle width direction is defined as an outer second land portion.

Furthermore, the land portion 33 between the second land portions 32, 34 is defined as a center land portion. The center land portion 33 is disposed on the tire equatorial plane CL.

In the configuration of in FIG. 2, a groove area ratio of a tire ground contact region is in the range of from 18% or more to 30% or less. Thus, the dry performance and the wet performance of the tire are balanced.

"Groove area ratio" is defined as: groove area/(groove area+ground contact area). "Groove area" refers to the opening area of the grooves at the ground contact surface. Additionally, "groove" refers to the circumferential grooves and the lug grooves in the tread portion and does not include, for example, sipes, kerfs, and notch portions. "Ground contact area" is measured as a contact area between the tire and a road surface. Additionally, the groove area and the ground contact area are measured at a contact surface between a tire and a flat plate when the tire is mounted on a specified rim, inflated to the specified internal pressure, placed vertically on the flat plate in a static state, and loaded with a load corresponding to the specified load.

Inner Shoulder Land Portion

Figure 3:
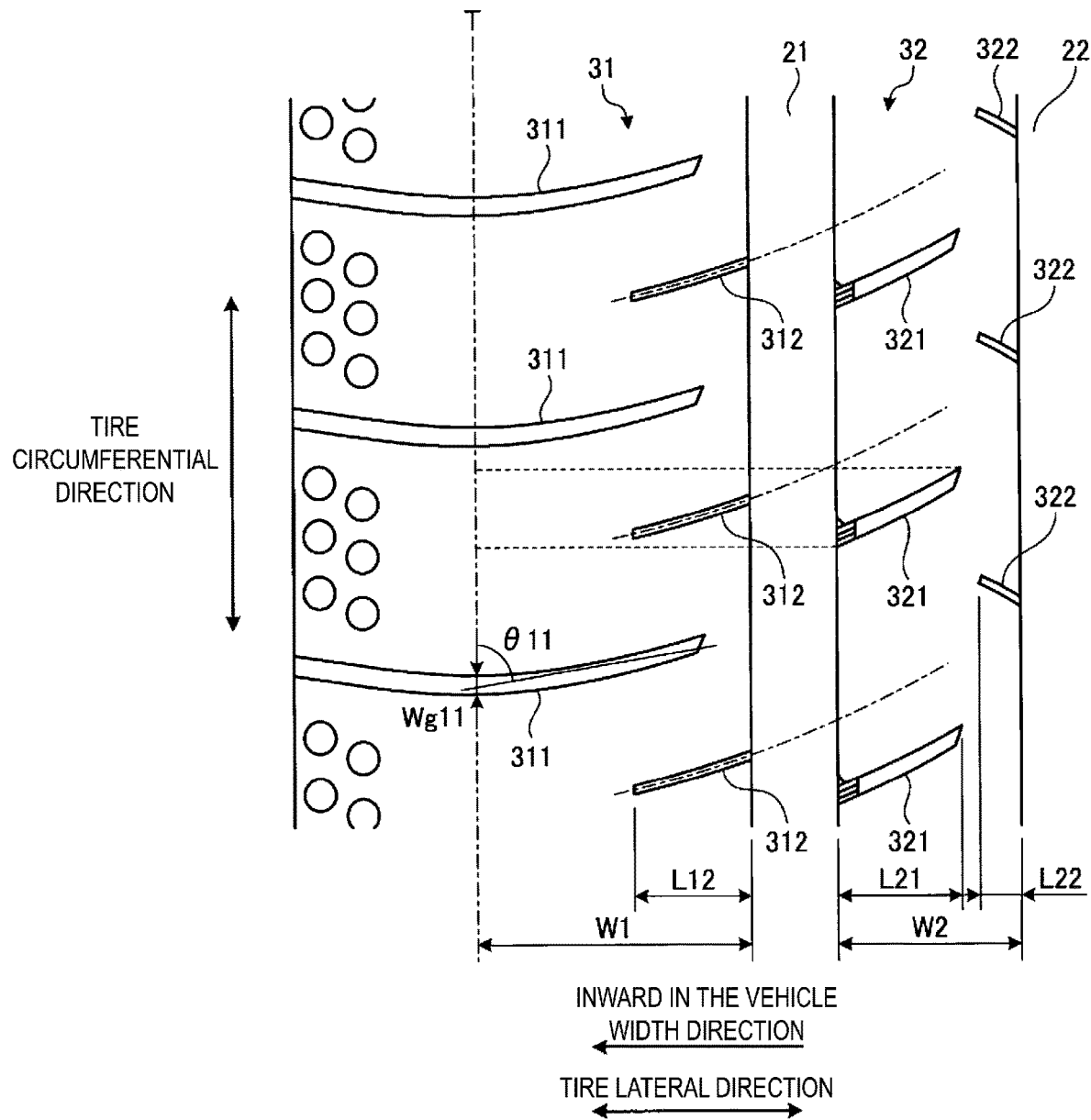
FIG. 3 is an enlarged view illustrating a main portion of a region inward in a vehicle width direction of the tread surface illustrated in FIG. 2.
Figure 4:
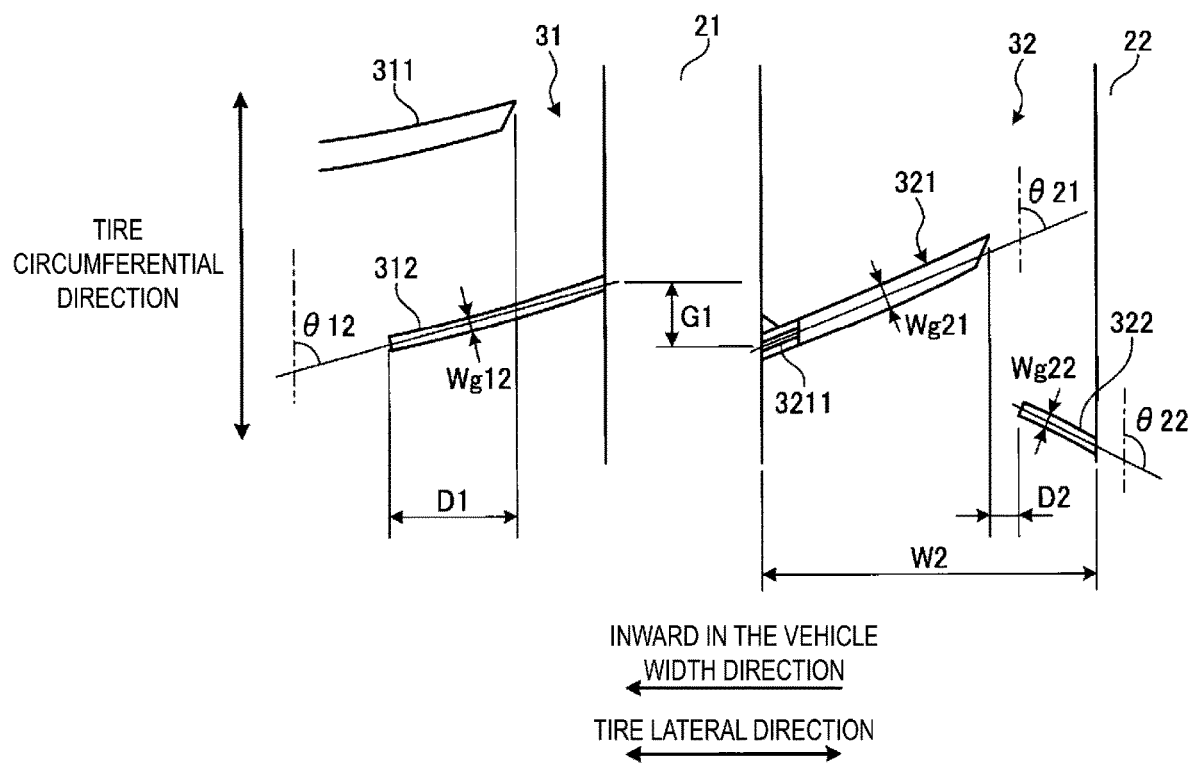
FIG. 4 is a plan view illustrating an inner shoulder sipe and an inner second lug groove.
Figure 5:
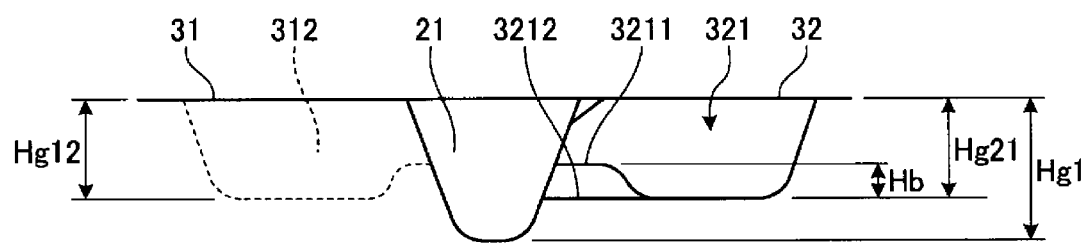
FIG. 5 is a cross-sectional view in a depth direction of the inner shoulder sipe and the inner second lug groove illustrated in FIG. 4.

FIG. 3 is an enlarged view illustrating a main portion of the region inward in the vehicle width direction of the tread surface illustrated in FIG. 2. The same drawing especially illustrates the enlarged inner shoulder land portion 31 and inner second land portion 32. FIG. 4 is a plan view illustrating an inner shoulder sipe and an inner second lug groove. FIG. 5 is a cross-sectional view in a depth direction of the inner shoulder sipe and the inner second lug groove illustrated in FIG. 4.

As illustrated in FIG. 3, the inner shoulder land portion 31 includes a plurality of inner shoulder lug grooves 311 and a plurality of inner shoulder sipes 312.

The inner shoulder lug groove 311 extends inward in the tire lateral direction from the tire ground contact edge T and terminates in a ground contact surface of the inner shoulder land portion 31 without connecting to the inner side shoulder main groove 21. Additionally, the plurality of inner shoulder lug grooves 311 are arranged at a predetermined pitch length in the tire circumferential direction. In the configuration of FIG. 3, the inner shoulder lug grooves 311 have an arc shape gently curved in the tire circumferential direction, but no such limitation is intended. The inner shoulder lug grooves 311 may have a straight shape or a bent shape (not illustrated). Additionally, a groove width Wg11 (see FIG. 3) of the inner shoulder lug groove 311 is in the range 1.5 mm≤Wg11≤4.5 mm, and a groove depth Hg11 (not illustrated) is in the range 0.55≤Hg11/Hg1≤0.80 to the groove depth Hg1 (see FIG. 5) of the inner side shoulder main groove 21. An inclination angle θ11 (see FIG. 3) of the inner shoulder lug groove 311 with respect to the tire circumferential direction is in the range 75 degrees≤θ11≤105 degrees. This reduces the pattern noise of the tire.

The groove width and the groove depth of the shoulder lug groove are measured as the maximum groove width and the maximum groove depth in the ground contact surface.

The inclination angle of the lug groove is measured as an angle formed by a straight line connecting both end portions of the lug groove in the tire ground contact surface and the tire circumferential direction.

The inner shoulder sipe 312 extends from the inner side shoulder main groove 21 outward in the tire lateral direction, and terminates in the ground contact surface of the inner shoulder land portion 31 without meeting the tire ground contact edge T. Also, a single inner shoulder sipe 312 is disposed between the adjacent inner shoulder lug grooves 311, 311. Thus, the inner shoulder lug grooves 311 and the inner shoulder sipes 312 are disposed in alternation in the tire circumferential direction. Accordingly, compared to a configuration in which only the lug grooves or only the sipes are disposed in the tire circumferential direction, the wet performance and the dry performance of the tire are balanced, and the pattern noise of the tire is reduced.

Additionally, in the configuration of FIG. 3, the inner shoulder sipe 312 has a linear shape or a gentle arc shape, and extends inclined to be parallel to the inner shoulder lug groove 311. Additionally, a sipe width Wg12 (see FIG. 4) of the inner shoulder sipe 312 is in the range 0.6 mm≤Wg12≤1.8 mm, and a sipe depth Hg12 (see FIG. 5) is in the range 3.0 mm≤Hg12≤7.0 mm. Thus, the inner shoulder sipe 312 properly closes when the tire comes into contact with the ground. An inclination angle θ12 (see FIG. 4) of the inner shoulder sipe 312 with respect to the tire circumferential direction is in the range 55 degrees≤θ12≤80 degrees.

The sipe width is measured as the maximum distance of the opening width of the sipe at the road contact surface of the land portion, when the tire is mounted on a specified rim, inflated to the specified internal pressure, and in an unloaded state.

The sipe depth is measured as the maximum distance from the tread contact surface to the sipe bottom, when the tire is mounted on a specified rim, inflated to the specified internal pressure, and in an unloaded state. Additionally, in a configuration in which a sipe includes a ridged/grooved portion on the groove bottom, the sipe depth is measured excluding this portion.

Additionally, an extension length L12 (see FIG. 3) of the inner shoulder sipe 312 in the tire lateral direction and a ground contact width W1 (see FIG. 3) of the inner shoulder land portion 31 preferably have a relationship 0.35≤L12/W1≤0.60, and more preferably have a relationship 0.40≤L12/W1≤0.55. The lower limit ensures a water removal action by the inner shoulder sipe 312 and improves the wet performance of the tire. The upper limit ensures the rigidity of the shoulder land portion 31 and ensures the dry performance of the tire.

The ground contact width of the land portion is measured as the maximum linear distance in the tire axial direction of a contact surface between a flat plate and the land portion when the tire is mounted on a specified rim, inflated to the specified internal pressure, placed perpendicular to the flat plate in a static state, and loaded with a load corresponding to the specified load.

Additionally, in the configuration of FIG. 3, the inner shoulder land portion 31 is a rib continues in the tire circumferential direction and is not divided in the tire circumferential direction or the tire lateral direction by grooves or sipes. Specifically, as described above, the inner shoulder lug grooves 311 and the inner shoulder sipes 312 do not traverse the inner shoulder land portion 31 and are not mutually connected. Thus, a ground contact surface of the inner shoulder land portion 31 is continuous in the tire circumferential direction.

Additionally, in FIG. 4, the inner shoulder lug grooves 311 and the inner shoulder sipes 312 are disposed to overlap with one another in the tire lateral direction. Additionally, a distance D1 of an overlapping portion between the inner shoulder lug groove 311 and the inner shoulder sipe 312 in the tire lateral direction preferably has the relationship $0.15 \le D1/W1 \le 0.35$ to the ground contact width W1 of the inner shoulder land portion 31, and more preferably has the relationship $0.20 \le D1/W1 \le 0.30$. Accordingly, the rigidity of the inner shoulder land portion 31 is ensured, and the dry performance of the tire is ensured.

Inner Second Land Portion

As illustrated in FIG. 3, the inner second land portion 32 includes a plurality of inner second lug grooves 321 and a plurality of inner second sipes 322.

The inner second lug groove 321 extends inward in the tire lateral direction from the inner side shoulder main groove 21 and terminates in the inner second land portion 32 without connecting to the inner side center main groove 22. Additionally, the plurality of inner second lug grooves 321 are arranged in the tire circumferential direction at the same pitch as those of the inner shoulder lug grooves 311 and the inner shoulder sipes 312. In the configuration of FIG. 3, the inner second lug groove 321 has an arc shape that is gently curved in the tire circumferential direction, but no such limitation is intended. The inner second lug groove 321 may have a straight shape or a bent shape (not illustrated).

In the configuration described above, (1) the inner shoulder sipe 312 opens from the tire ground contact edge T side to the inner side shoulder main groove 21, and the inner second lug groove 321 opens from the tire equatorial plane CL side to the inner side shoulder main groove 21 (see FIG. 2). Accordingly, compared to a configuration in which both are sipes, the drainage properties of the region inward in the vehicle width direction of the tread are improved and the wet performance of the tire is improved. Additionally, compared to a configuration in which both are lug grooves, the rigidity of the region inward in the vehicle width direction of the tread is ensured and the dry performance of the tire is improved. Thus, the wet performance and the dry performance of the tire are provided in a compatible manner. Additionally, (2) the inner shoulder sipe 312 and the inner second lug groove 321 have a semi-closed structure in which the inner shoulder sipe 312 and the inner second lug groove 321 terminate in the land portions 31, 32. This ensures the rigidity of the land portions 31, 32 and the dry performance of the tire is improved.

A groove width Wg21 (see FIG. 4) of the inner second lug groove 321 is in the range 1.5 mm $\le$ Wg21 $\le$ 4.5 mm, and a groove depth Hg21 (see FIG. 5) is in the range $0.55 \le Hg21/Hg1 \le 0.80$ to the groove depth Hg1 (see FIG. 5) of the inner side shoulder main groove 21. An inclination angle θ21 (see FIG. 4) of the inner second lug groove 321 with respect to the tire circumferential direction is in the range 55 degrees $\le \theta 21 \le 80$ degrees. The lower limit suppresses occurrence of chipping wear, and the upper limit ensures wet turning performance of the tire.

In FIG. 3, an extension length L21 of the inner second lug groove 321 in the tire lateral direction and a ground contact width W2 of the inner second land portion 32 preferably have a relationship $0.50 \le L21/W2 \le 0.80$, and more preferably have a relationship $0.60 \le L21/W2 \le 0.70$. The lower limit ensures an effect of improving drainage properties by the inner second lug groove 321 and improves the wet performance of the tire. The upper limit ensures the rigidity of the inner second land portion 32 and ensures the dry performance of the tire.

Additionally, in the configuration of FIG. 3, the inner second lug groove 321, and the inner shoulder lug groove 311 and the inner shoulder sipe 312 of the inner shoulder land portion 31 are mutually inclined in the same direction with respect to the tire circumferential direction. This improves the drainage properties of the tire. Also, the inner second lug groove 321 is disposed so as not to overlap with the inner shoulder lug groove 311 in the tire circumferential direction (see the dashed line in FIG. 3). Specifically, in projection view in the tire lateral direction, the inner second lug groove 321 does not meet the inner shoulder lug groove 311 and is disposed to be mutually separated in the tire circumferential direction. This reduces the pattern noise of the tire.

As illustrated in FIG. 3, the inner second lug groove 321 is disposed offset with respect to an extension line of the inner shoulder sipe 312 in the tire circumferential direction. In the configuration of FIG. 3, all of the inner second lug grooves 321 are disposed offset with respect to the extension lines of the inner shoulder sipes 312 in the tire circumferential direction, and are disposed offset to the opposite side with respect to the inclination directions of the groove center lines of the inner shoulder sipes 312. Also, in FIG. 4, a distance G1 between the opening position of the inner shoulder sipe 312 and the opening position of the inner second lug groove 321 in the tire circumferential direction to the inner side shoulder main groove 21 preferably has the relationship $1.50 \le G1/Wg21 \le 4.00$ to the groove width Wg21 of the inner second lug groove 321, and more preferably has the relationship $2.00 \le G1/Wg21 \le 3.50$. This reduces the pattern noise of the tire.

As illustrated in FIG. 5, the inner second lug groove 321 includes a raised bottom portion 3211 and a slit 3212.

The raised bottom portion 3211 is formed in the opening portion of the inner second lug groove 321 to the inner side shoulder main groove 21 to bottom up a groove bottom of the inner second lug groove 321. This reinforces the rigidity of the inner second land portion 32. A height Hb of the raised bottom portion 3211 is in the range $0.30 \le Hb/Hg21 \le 0.50$ to the groove depth Hg21 of the inner second lug groove 321.

The height Hb of the raised bottom portion is measured as the maximum height from a measurement point of the groove depth Hg21 of the inner second lug groove 321.

The slit 3212 is formed in the raised bottom portion 3211 and penetrates the raised bottom portion 3211 in a groove length direction of the inner second lug groove 321. Also, a width (not illustrated) of the slit 3212 is 1 mm or less, and a depth (not illustrated) of the slit 3212 is less than or equal to the height Hb of the raised bottom portion 3211. In the configuration of FIG. 5, the depth of the slit 3212 is equal to the height Hb of the raised bottom portion 3211.

Note that, instead of the inner second lug groove 321 described above, a chamfered sipe 321' (see FIG. 12) described later may be disposed.

As illustrated in FIG. 3, the inner second sipe 322 extends outward in the tire lateral direction from the inner side center main groove 22 and terminates in the ground contact surface of the inner second land portion 32. Also, a single inner second sipe 322 is disposed between the adjacent inner second lug grooves 321, 321. The inner second lug grooves 321 and the inner second sipes 322 are disposed in alternation in the tire circumferential direction. Accordingly, compared to a configuration in which only the lug grooves or only the sipes are disposed in the tire circumferential direction, the wet performance and the dry performance of the tire are balanced, and the pattern noise of the tire is reduced. In particular, the inner second lug groove 321 is disposed on the edge portion on the tire ground contact edge T side of the inner second land portion 32, and the inner second sipe 322 is disposed on the edge portion on the tire equatorial plane CL side of the inner second land portion 32, thereby effectively enhancing the balance between the wet performance and the dry performance of the tire.

The inner second sipe 322 and the inner shoulder sipe 312 of the inner shoulder land portion 31 are inclined in mutually opposite directions with respect to the tire circumferential direction. Accordingly, compared to a configuration in which both are inclined in the same direction, an edge effect to both directions in the tire circumferential direction is ensured, the wet performance of the tire is improved, and the pattern noise of the tire is reduced. Additionally, a sipe width Wg22 (see FIG. 4) of the inner second sipe 322 is in the range 0.6 mm<Wg22≤1.8 mm, and a sipe depth Hg22 (not illustrated) is in the range 3.0 mm≤Hg22≤7.0 mm. Accordingly, the inner second sipe 322 properly closes when the tire comes into contact with the ground. An inclination angle θ22 (see FIG. 4) of the inner second sipe 322 with respect to the tire circumferential direction is in the range 110 degrees≤θ22≤130 degrees.

Additionally, in FIG. 3, an extension length L22 of the inner second sipe 322 in the tire lateral direction and the ground contact width W2 of the inner second land portion 32 preferably have a relationship 0.15≤L22/W2≤0.30, and more preferably have a relationship 0.20≤L22/W2≤0.25. The lower limit ensures the water removal action and uneven wear resistance performance by the inner second sipe 322 and improves the wet performance and the uneven wear resistance performance of the tire. The upper limit ensures the rigidity of the inner second land portion 32 and ensures the dry performance of the tire.

In particular, in the configuration of FIG. 4, the inner second lug groove 321 and the inner second sipe 322 are disposed without an overlap in the tire lateral direction. A distance D2 between the inner second lug groove 321 and the inner second sipe 322 in the tire lateral direction is preferably in the range 0 mm≤D2, and more preferably in the range 2.0 mm≤D2. Accordingly, this configuration ensures the rigidity of the inner second land portion 32 and ensures the dry performance of the tire compared to a configuration in which both overlap. The upper limit of the distance D2 is not particularly limited, but is subject to restrictions in relation to the extension lengths L21, L22 (see FIG. 3) of the inner second lug groove 321 and the inner second sipe 322.

Center Land Portion

Figure 6:
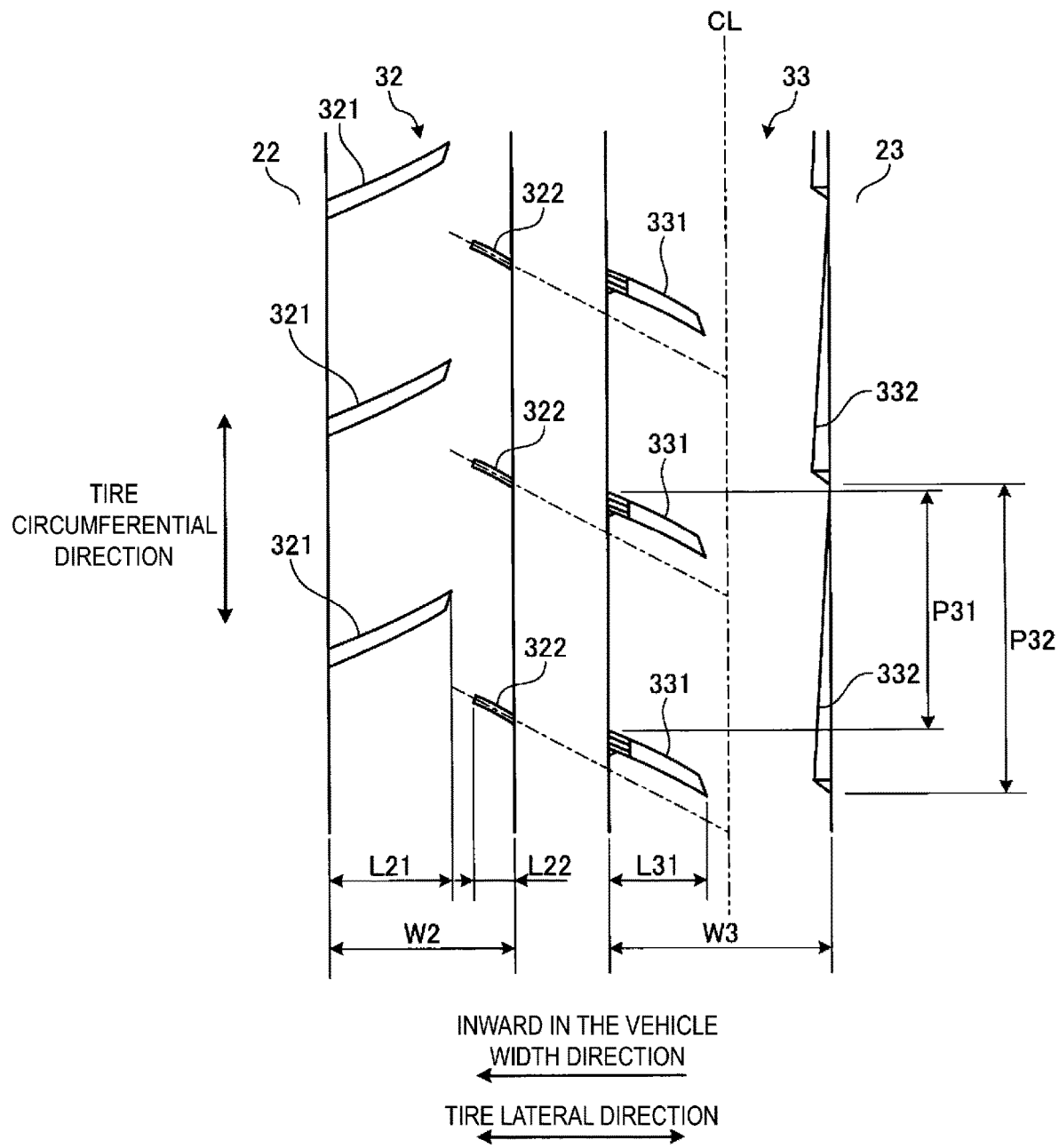
FIG. 6 is an enlarged view illustrating a main portion of a region inward in the vehicle width direction of the tread surface illustrated in FIG. 2.
Figure 7:
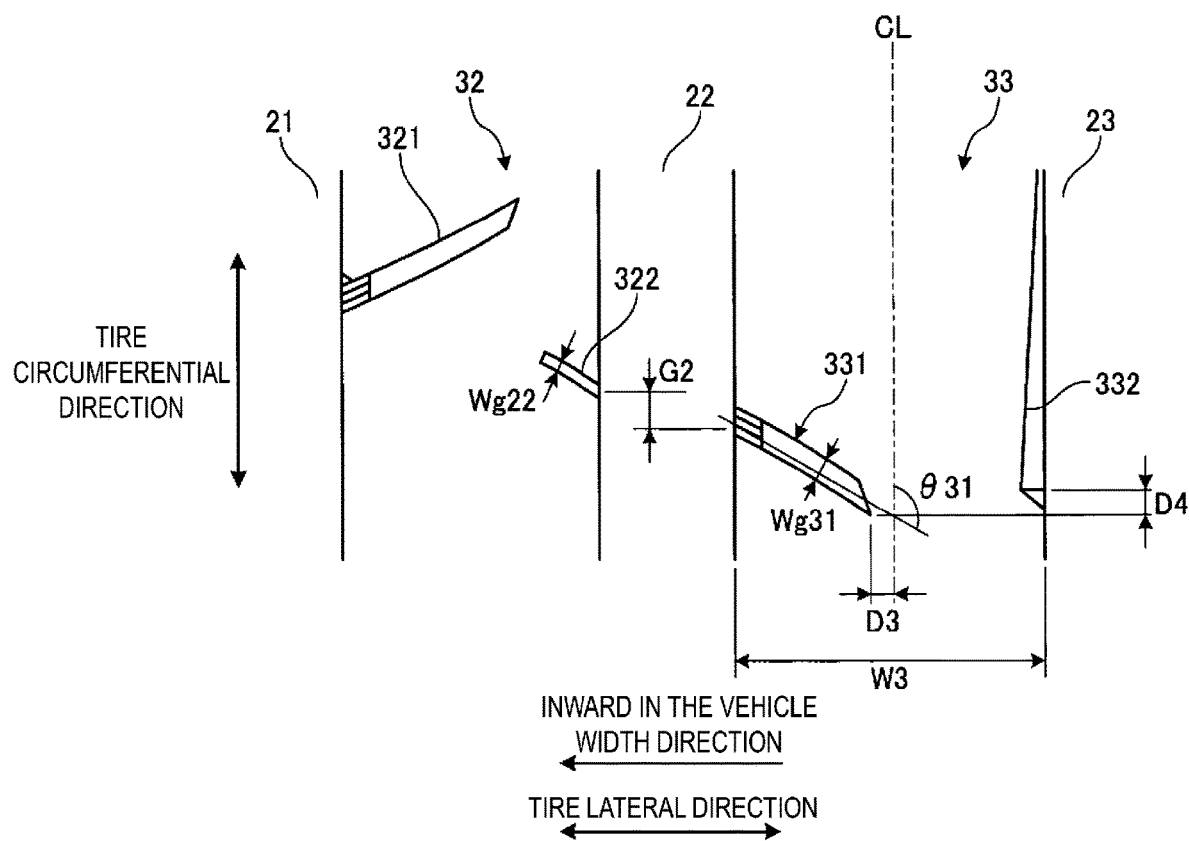
FIG. 7 is an enlarged plan view illustrating an inner second land portion and a center land portion illustrated in FIG. 6.
Figure 8:
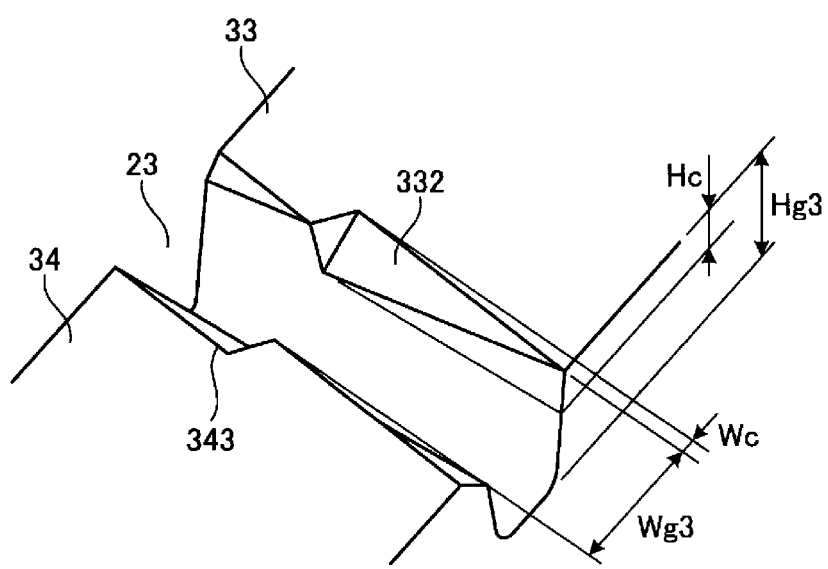
FIG. 8 is a perspective view illustrating a chamfered portion of the center land portion illustrated in FIG. 6.

FIG. 6 is an enlarged view illustrating a main portion of the region inward in the vehicle width direction of the tread surface illustrated in FIG. 2. The same drawing especially illustrates the enlarged inner second land portion 32 and center land portion 33. FIG. 7 is an enlarged plan view illustrating the inner second land portion and the center land portion illustrated in FIG. 6. FIG. 8 is a perspective view illustrating a chamfered portion of the center land portion illustrated in FIG. 6.

As illustrated in FIG. 6, the center land portion 33 includes a plurality of center lug grooves 331 and a plurality of chamfered portions 332.

The center lug groove 331 extends from the inner side center main groove 22 toward the tire equatorial plane CL and terminates in the ground contact surface of the center land portion 33. Additionally, the plurality of center lug grooves 331 are arranged in the tire circumferential direction with a predetermined pitch length P31. In the configuration of FIG. 6, the center lug groove 331 has an arc shape that is gently curved in the tire circumferential direction, but no such limitation is intended. The center lug groove 331 may have a straight shape or a bent shape (not illustrated). A groove width Wg31 (see FIG. 7) of the center lug groove 331 is in the range 1.5 mm≤Wg31≤4.5 mm, and a groove depth (not illustrated) is in the range of from 4.5 mm or more to 7.0 mm or less. The lower limit ensures a drainage function of the center lug groove 331 and improves the wet performance of the tire. The upper limit ensures the rigidity of the center land portion 33 and ensures the dry performance of the tire. Additionally, an inclination angle θ31 (see FIG. 7) of the center lug groove 331 with respect to the tire circumferential direction is in the range 110 degrees≤θ31≤130 degrees. The lower limit of the inclination angle suppresses the occurrence of chipping wear, and the upper limit ensures the wet turning performance of the tire.

Additionally, in FIG. 6, an extension length L31 of the center lug groove 331 in the tire lateral direction and a ground contact width W3 of the center land portion 33 preferably have a relationship 0.30≤L31/W3≤0.60, and more preferably have a relationship 0.40≤L31/W3≤0.50. The lower limit ensures the drainage function of the center lug groove 331 and improves the wet performance of the tire. The upper limit ensures the rigidity of the center land portion 33 and ensures the dry performance of the tire.

Additionally, in the configuration of FIG. 6, the center lug groove 331 and the inner second lug groove 321 of the inner second land portion 32 are inclined in mutually opposite directions with respect to the tire circumferential direction. In such a configuration, compared to a configuration in which both are inclined in the same direction, an edge effect to both directions in the tire circumferential direction is ensured, the wet performance of the tire is improved, and the pattern noise of the tire is reduced.

Additionally, the center lug groove 331 and the inner second sipe 322 of the inner second land portion 32 are mutually inclined in the same direction with respect to the tire circumferential direction. Thus, drainage properties in the region inward in the vehicle width direction are improved.

Also, as illustrated in FIG. 2, an inclination direction of the zigzag-shaped long portion of the outer side center main groove 23 with respect to the tire circumferential direction is set in the opposite direction to the inclination direction (see the inclination angle θ11 in FIG. 3) of the inner shoulder lug groove 311. In such a configuration, compared to a configuration in which both are inclined in the same direction, an edge effect to both directions in the tire circumferential direction is ensured and the wet performance of the tire is improved.

As illustrated in FIG. 6, the center lug groove 331 is disposed offset with respect to an extension line of the inner second sipe 322 in the tire circumferential direction. In the configuration of FIG. 6, all of the center lug grooves 331 are disposed offset with respect to the extension lines of the inner second sipes 322 in the tire circumferential direction, and are disposed offset to the opposite side with respect to the inclination direction of the inner second sipes 322. Also, in FIG. 7, a distance G2 in the tire circumferential direction between the opening position of the inner second sipe 322 and the opening position of the center lug groove 331 to the inner side center main groove 22 preferably has the relationship 0≤G2/Wg31≤2.0 to the width Wg31 of the center lug grooves 331 and more preferably has the relationship 0.50≤G2/Wg31≤1.50. This reduces the pattern noise of the tire.

As illustrated in FIG. 7, the center lug groove 331 terminates in the region inward in the vehicle width direction without meeting the tire equatorial plane CL. A distance D3 between a terminating end portion of the center lug groove 331 and the tire equatorial plane CL in the tire lateral direction is preferably in the range 1.0 mm≤D3. Thus, the wet performance of the tire and pattern noise performance are balanced at high levels. The upper limit of the distance D3 is not particularly limited, but is subject to restrictions in relation to the extension length L31 (see FIG. 6) of the center lug groove 331.

Additionally, in FIG. 7, the center lug groove 331 includes a raised bottom portion and a slit (reference signs are omitted in the drawing). The configurations of these raised bottom portion and slit are the same as those of the raised bottom portion 3211 and the slit 3212 of the inner second lug groove 321, and thus descriptions thereof will be omitted.

Note that, instead of the center lug groove 331 described above, a chamfered sipe 331' (see FIG. 12) described later may be disposed.

As illustrated in FIG. 6, the chamfered portions 332 are formed on the edge portions of the center land portion 33 outward in the vehicle width direction (see FIG. 2). In the configuration of FIG. 6, the chamfered portion 332 has a corner chamfer in a three-sided pyramid (see FIG. 8), and the chamfered portions 332 have an L shape formed by connecting long portions and short portions on a road contact surface of the center land portion 33. Moreover, the plurality of chamfered portions 332 are formed continuously in the tire circumferential direction. Thus, the edge portion on the outer side center main groove 23 side of the center land portion 33 has a zigzag shape formed by connecting the long portions and the short portions in alternation. The effect of the edge portion with the zigzag shape improves the wet performance of the tire. In addition, a ratio between a circumferential length of the short portion and a circumferential length of the long portion of the chamfered portion 332 (dimension symbol is omitted in drawing) is preferably in the range of from 0.03 or more to 0.10 or less, and more preferably in the range of from 0.04 or more to 0.06 or less.

Additionally, in FIG. 6, a zigzag-shaped pitch length P32 of the outer side center main grooves 23 preferably has the relationship 0.50≤P31/P32≤1.00 to the pitch length P31 of the center lug grooves 331, and more preferably has the relationship 0.70≤P31/P32≤0.90. In the configuration of FIG. 6, the plurality of chamfered portions 332 are formed continuously in the tire circumferential direction, and thus the zigzag-shaped pitch length P32 is substantially equal to the circumferential length of the chamfered portion 332. In addition, in the configuration of FIG. 6, the zigzag-shaped pitch length P32 is longer than the pitch length P31 of the center lug grooves 331 (P31<P32), and a pitch number N32 of the zigzag shapes has the relationship 1.00≤N32/N31≤1.40 to a pitch number N31 of the center lug grooves 331.

Additionally, as illustrated in FIG. 7, the bent portion of the chamfered portion 332 and the terminating end portion of the center lug groove 331 are at the same position in the tire circumferential direction. Specifically, when a distance D4 in the tire circumferential direction between the bent portion of the chamfered portion 332 and the terminating end portion of the center lug groove 331 is 5.0 mm or less, it can be said that both are at the same position in the tire circumferential direction. As a result, the uneven wear resistance of the tire is improved.

In FIG. 8, a depth Hc of the chamfered portion 332 has the relationship 0.30≤Hc/Hg3≤0.50 to the groove depth Hg3 of the outer side center main groove 23. The lower limit ensures the effect of improving the drainage properties by the chamfered portion 332, and the upper limit ensures the rigidity of the center land portion 33. Additionally, a width Wc of the chamfered portion 332 is preferably in the range 1.0 mm≤Wc≤3.0 mm. The lower limit ensures the effect of improving the drainage properties by the chamfered portion 332, and the upper limit ensures the ground contact area of the center land portion 33.

The depth Hc of the chamfered portion is measured as a distance from the road contact surface of the land portion to the maximum depth position of the chamfered portion.

The width Wc of the chamfered portion is measured as a distance from a measurement point of the groove width of the main groove to the maximum width position of the chamfered portion.

Outer Second Land Portion

Figure 9:
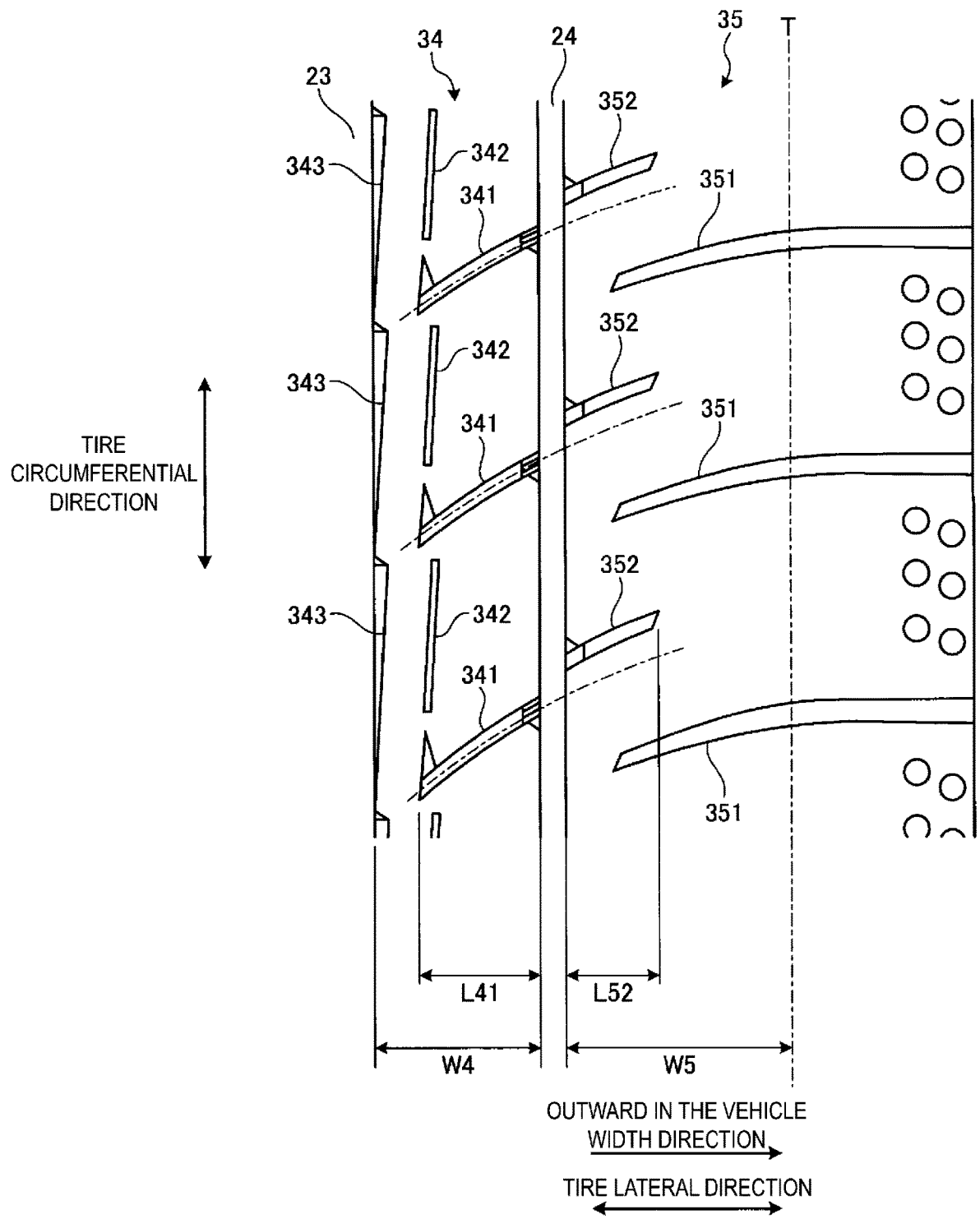
FIG. 9 is an enlarged view illustrating a main portion of a region outward of the tread surface in the vehicle width direction illustrated in FIG. 2.
Figure 10:
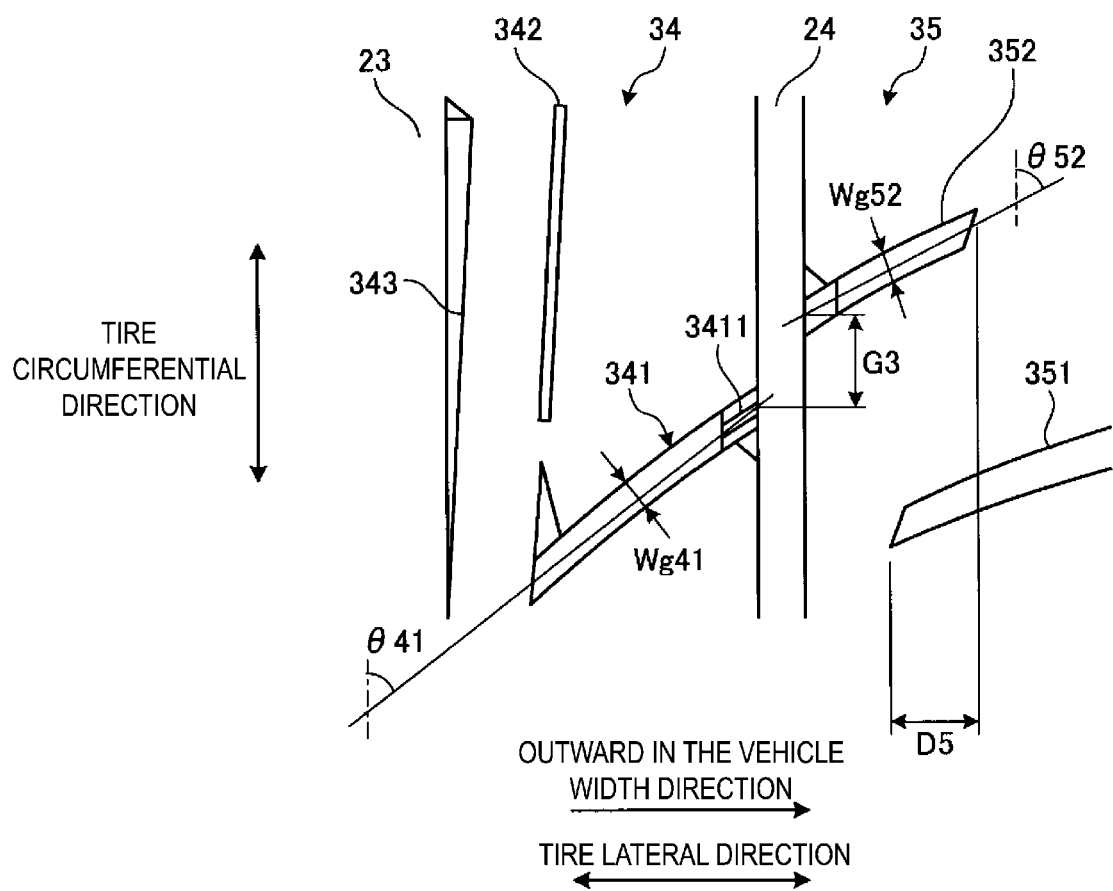
FIG. 10 is an enlarged view illustrating an outer second land portion and an outer shoulder land portion illustrated in FIG. 9.
Figure 11:
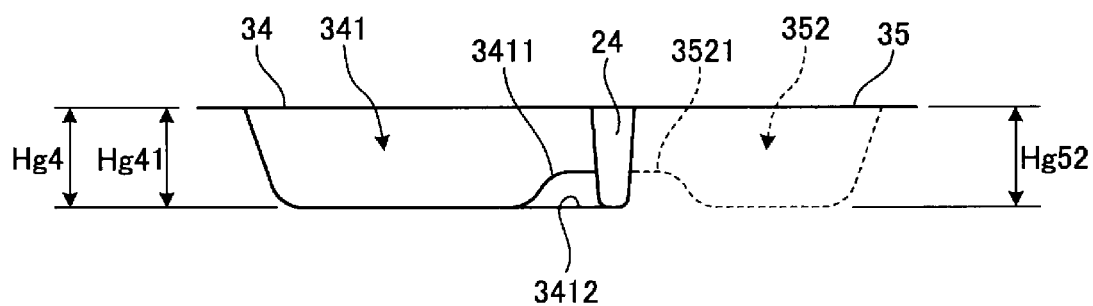
FIG. 11 is a cross-sectional view of a bent lug groove and a first outer shoulder lug groove in a depth direction illustrated in FIG. 10.

FIG. 9 is an enlarged view illustrating a main portion of a region outward of the tread surface in the vehicle width direction illustrated in FIG. 2. The same drawing especially illustrates enlarged outer second land portion 34 and outer shoulder land portion 35. FIG. 10 is an enlarged view illustrating the outer second land portion and the outer shoulder land portion illustrated in FIG. 9. FIG. 11 is a cross-sectional view of a bent lug groove and a first outer shoulder lug groove in a depth direction illustrated in FIG. 10.

As illustrated in FIG. 9, the outer second land portion 34 includes a plurality of bent lug grooves 341, a plurality of closed narrow grooves 342, and a plurality of chamfered portions 343.

The bent lug groove 341 extends from the circumferential narrow groove 24 inward in the tire lateral direction, bends in a hook shape in the tire circumferential direction, and terminates in a ground contact surface of the outer second land portion 34. Additionally, the bent lug groove 341 has an extending portion in the tire lateral direction having a long structure and an extending portion in the tire circumferential direction having a short structure. Additionally, the plurality of bent lug grooves 341 are arranged in the tire circumferential direction with a predetermined pitch length. A groove width Wg41 (see FIG. 10) of the bent lug groove 341 is in the range 1.5 mm≤Wg41≤4.5 mm, and a groove depth Hg41 (see FIG. 11) has the relationship 0.50≤Hg41/Hg4≤1.50 to the groove depth Hg4 (see FIG. 11) of the circumferential narrow groove 24. The lower limit ensures the drainage function of the bent lug grooves 341 and improves the wet performance of the tire. The upper limit ensures the rigidity of the outer second land portion 34 and ensures the dry performance of the tire. Additionally, an inclination angle θ41 (see FIG. 10) of a body portion of the bent lug groove 341 with respect to the tire circumferential direction is in the range 40 degrees≤θ41≤65 degrees. The lower limit suppresses occurrence of chipping wear, and the upper limit ensures the wet turning performance of the tire.

The inclination angle θ41 of the bent lug groove is measured as an angle formed by a straight line connecting a terminating end portion of the body portion of the bent lug groove to an opening portion of the bent lug groove to the circumferential narrow groove and the tire circumferential direction.

In FIG. 9, an extension length L41 of the bent lug groove 341 in the tire lateral direction is in the range 0.65≤L41/W4≤0.85 to a ground contact width W4 of the outer second land portion 34. Accordingly, the dry performance and the wet performance of the tire are improved in good balance. As illustrated in FIG. 2, the body portion of the bent lug groove 341 and the inner second lug groove 321 of the inner second land portion 32 are inclined in the same direction with respect to the tire circumferential direction. This provides the wet performance of the tire regardless of a tire rotation direction.

Additionally, in FIGS. 10 and 11, the bent lug groove 341 includes a raised bottom portion 3411 and a slit 3412. The configurations of these raised bottom portion 3411 and slit 3412 are the same as those of the raised bottom portion 3211 and the slit 3212 of the inner second lug groove 321, and thus descriptions thereof will be omitted.

The closed narrow groove 342 is disposed between the adjacent bent lug grooves 341, 341 and extends in the tire circumferential direction. Also, a single closed narrow groove 342 is disposed between the adjacent bent lug grooves 341, 341 and is disposed to be separated from the respective adjacent bent lug grooves 341, 341. Additionally, the closed narrow groove 342 extends in the tire circumferential direction from a terminating end portion of the bent lug groove 341 along an extension line of the short portion of the bent lug groove 341. Additionally, the closed narrow groove 342 has a linear shape and extends parallel to the long portion of the chamfered portion 343 described later while being inclined with respect to the tire circumferential direction. Accordingly, an arrangement relationship between the closed narrow grooves 342 and the bent lug grooves 341 is made appropriate, and the rigidity of the outer second land portions 34 is made uniform.

As illustrated in FIG. 9, the chamfered portion 343 is formed on the edge portion on the tire equatorial plane CL side (see FIG. 2) of the outer second land portion 34. Additionally, the chamfered portion 343 of the outer second land portion 34 has the same structure as that of the chamfered portion 332 of the center land portion 33, and is disposed to be point symmetric with respect to the chamfered portion 332 of the center land portion 33. Additionally, the plurality of chamfered portions 343 are arranged continuously in the tire circumferential direction at the same pitch as that of the chamfered portions 332 of the center land portion 33. Thus, an edge portion of the outer second land portion 34 has a zigzag shape formed by connecting the long portions and the short portions in alternation, and the outer side center main groove 23 has a zigzag-shaped groove opening portion extending in the tire circumferential direction. The effect of the edge portion with the zigzag shape improves the wet performance of the tire.

Outer Shoulder Land Portion

As illustrated in FIG. 9, the outer shoulder land portion 35 includes first and second outer shoulder lug grooves 351, 352.

The first outer shoulder lug groove 351 extends inward in the tire lateral direction from the tire ground contact edge T and terminates in a ground contact surface of the outer shoulder land portion 35 without connecting to the circumferential narrow groove 24. Additionally, the plurality of first outer shoulder lug grooves 351 are arranged with a predetermined pitch length in the tire circumferential direction. Also, in the configuration of FIG. 9, the first outer shoulder lug groove 351 has an arc shape that is gently curved in the tire circumferential direction, but no such limitation is intended. The first outer shoulder lug groove 351 may have a straight shape or a bent shape (not illustrated). Also, an inclination angle (dimension symbol is omitted in the drawing) of the first outer shoulder lug groove 351 with respect to the tire circumferential direction is in the range of from 75 degrees or more to 105 degrees or less. This reduces the pattern noise of the tire. As illustrated in FIG. 2, the first outer shoulder lug groove 351 and the inner shoulder lug groove 311 of the inner shoulder land portion 31 are inclined in the same direction with respect to the tire circumferential direction. This provides the wet performance of the tire regardless of the tire rotation direction.

The second outer shoulder lug groove 352 extends outward in the tire lateral direction from the circumferential narrow groove 24 and terminates in the ground contact surface of the outer shoulder land portion 35 without meeting the tire ground contact edge T. Also, a single second outer shoulder lug groove 352 is disposed between the adjacent first outer shoulder lug grooves 351, 351. Thus, the first and second outer shoulder lug grooves 351, 352 are disposed in alternation the tire circumferential direction. Accordingly, compared to a configuration in which only the lug grooves or only the sipes are disposed in the tire circumferential direction, the wet performance and the dry performance of the tire are balanced, and the pattern noise of the tire is reduced.

Also, in the configuration of FIG. 9, the second outer shoulder lug groove 352 has a linear shape or a gentle arc shape and extends inclined to be parallel with the first outer shoulder lug groove 351. A groove width Wg52 (see FIG. 10) of the second outer shoulder lug groove 352 is in the range 1.5 mm≤Wg52≤4.5 mm, and a groove depth Hg52 (see FIG. 11) is in the range 4.0 mm≤Hg52≤7.0 mm. Thus, the drainage function of the second outer shoulder lug groove 352 is ensured. An inclination angle θ52 (see FIG. 10) of the second outer shoulder lug groove 352 with respect to the tire circumferential direction is in the range 50 degrees≤θ52≤75 degrees. Additionally, the inclination angle θ52 of the second outer shoulder lug groove 352 is larger than the inclination angle θ41 of the body portion of the bent lug groove 341 (θ41<θ52), and specifically, preferably has the relationship 5 degrees≤θ52−θ41≤10 degrees.

Additionally, in FIG. 9, an extension length L52 of the second outer shoulder lug groove 352 in the tire lateral direction and a ground contact width W5 of the outer shoulder land portion 35 preferably have a relationship 0.35≤L52/W5≤0.60, and more preferably have a relationship 0.40≤L52/W5≤0.55. The lower limit ensures the drainage function of the second outer shoulder lug groove 352 and improves the wet performance of the tire. The upper limit ensures the rigidity of the shoulder land portion 31 and ensures the dry performance of the tire.

Additionally, in FIG. 9, the extension length L52 of the second outer shoulder lug groove 352 in the tire lateral direction has the relationship 1.30≤L41/L52≤1.80 to the extension length L41 of the bent lug groove 341 of the outer second land portion 34. Thus, the second outer shoulder lug groove 352 is shorter than the bent lug groove 341. In such a configuration, the drainage properties of the outer second land portion 34 having a high degree of contribution to the wet performance is improved, and the rigidity of the outer shoulder land portion 35 having a high degree of contribution to the dry performance is ensured at the same time.

As illustrated in FIG. 9, the second outer shoulder lug groove 352 is disposed offset with respect to the extension line of the body portion of the bent lug groove 341 of the outer second land portion 34 in the tire circumferential direction. In the configuration of FIG. 9, all of the second outer shoulder lug grooves 352 are disposed offset to the extension lines of the bent lug grooves 341 in the tire circumferential direction, and are disposed offset in the same direction as the inclination direction of the groove center lines of the bent lug grooves 341. Also, in FIG. 10, a distance G3 in the tire circumferential direction between the opening position of the second outer shoulder lug groove 352 and the opening position of the bent lug groove 341 to the circumferential narrow groove 24 preferably has the relationship $2.00 \leq G3/Wg52 \leq 4.00$ to the width Wg52 of the second outer shoulder lug groove 352, and more preferably has the relationship $2.50 \leq G3/Wg52 \leq 3.50$. This reduces the pattern noise of the tire.

As illustrated in FIG. 11, the second outer shoulder lug groove 352 includes a raised bottom portion 3521 formed in a groove opening portion to the circumferential narrow groove 24. Thus, the rigidity of the outer shoulder land portion 35 is reinforced. The configuration of the raised bottom portion 3521 is the same as that of the raised bottom portion 3211 of the inner second lug groove 321, and thus descriptions thereof will be omitted. However, the raised bottom portion 3521 of the second outer shoulder lug groove 352 does not include a slit compared to the raised bottom portion 3211 of the inner second lug groove 321.

As illustrated in FIG. 10, the first and second outer shoulder lug grooves 351, 352 are disposed to overlap with one another in the tire lateral direction. Additionally, an amount of overlap (distance D5) between the first and second outer shoulder lug grooves 351, 352 preferably has the relationship $0.10 \leq D5/W5 \leq 0.30$ to the ground contact width W5 of the outer shoulder land portion 35, and more preferably has the relationship $0.15 \leq D5/W5 \leq 0.25$. The lower limit ensures the drainage function by the lug grooves 351, 352 and ensures the wet performance of the tire. The upper limit ensures the rigidity of the outer shoulder land portion 35 and ensures the dry performance of the tire.

Additionally, in the configuration of FIG. 9, the outer shoulder land portion 35 is a rib continues in the tire circumferential direction and is not divided in the tire circumferential direction or the tire lateral direction by grooves or sipes. Thus, the rigidity of the outer shoulder land portion 35 is enhanced.

MODIFIED EXAMPLES

Figure 12:
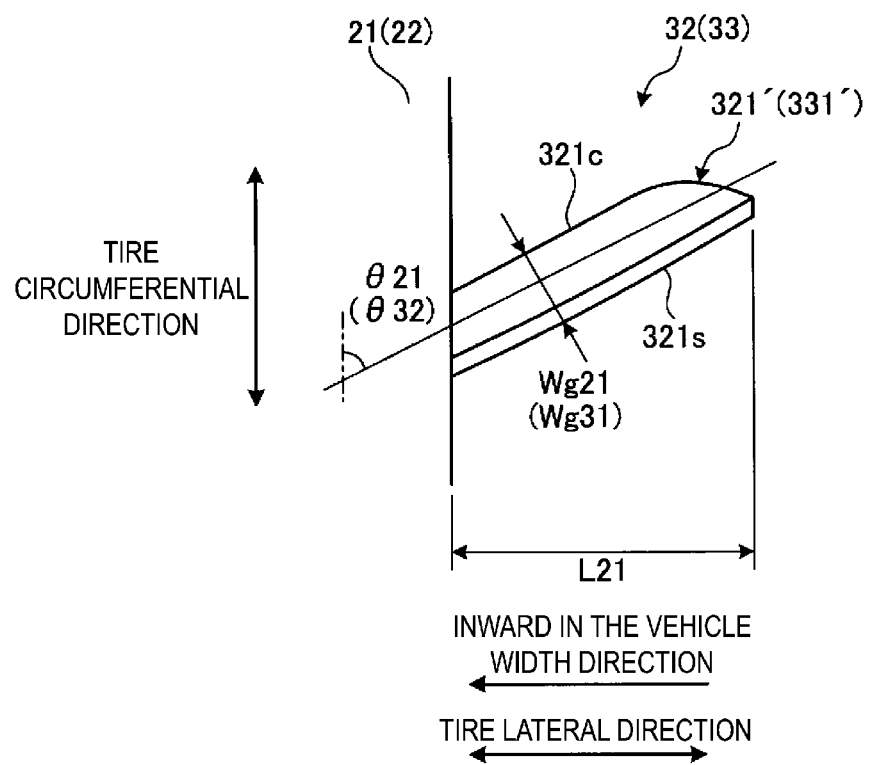
FIG. 12 is an explanatory diagram illustrating a modified example of the lug groove illustrated in FIGS. 4 and 7.

FIG. 12 is an explanatory diagram illustrating a modified example of the lug groove illustrated in FIGS. 4 and 7. In the drawing, constituents described in FIGS. 4 and 7 have the same reference signs, and their explanations are omitted.

In the configuration of FIG. 2, as illustrated in FIGS. 4 and 7, the sipe 312 (322) and the lug groove 321 (331) each open to the main groove 21 (22), and are disposed to be opposed to one another with the main groove 21 (22) interposed therebetween. The sipe 312 (322) is located outward in the tire lateral direction with respect to the lug groove 321 (331). Such a configuration is preferred compared to a configuration in which both are lug grooves in that the rigidity of the land portion 31 (32) on the tire ground contact edge T side (see FIG. 2) is increased, and the dry performance of the tire is improved. Additionally, compared to a configuration in which both are sipes, the land portion 32 (33) on the tire equatorial plane CL side (see FIG. 2) includes the lug grooves 321 (331) opening to outward in the tire lateral direction, and this is preferred in that the wet performance of the tire is properly ensured.

In contrast, in the configuration of FIG. 12, instead of the lug groove 321 (331) in FIGS. 4 and 7, a chamfered sipe 321' (331') is disposed. The chamfered sipe 321' (331') includes a sipe portion 321s and a chamfered portion 321c formed along the sipe portion 321s. Additionally, the chamfered portion 321c may be formed on only an edge portion on one side of the sipe portion 321s (see FIG. 12), may be formed on the edge portions on both sides of the sipe portion 321s, or may be formed around the entire circumference of the sipe portion 321s (not illustrated). Additionally, a sipe width of the sipe portion 321s is in the range of from 0.6 mm or more to 1.8 mm or less, and a depth of the sipe portion 321s is in the range of from 3.0 mm or more to 7.0 mm or less. Thus, the sipe portion 321s appropriately closes when the tire comes into contact with the ground.

In such a configuration, the rigidity of the land portions 31 (32) is increased compared to the configuration of FIGS. 4 and 7 described above, and thus the dry performance of the tire is further improved and the pattern noise of the tire is reduced. Additionally, the drainage function of the chamfered sipe 321' (331') is ensured by the chamfered portion 321c, and the wet performance of the tire is ensured.

Note that the width Wg21 (Wg31) of the chamfered sipe is measured as a total width of the sipe portion and the chamfered portion.

Figure 13:
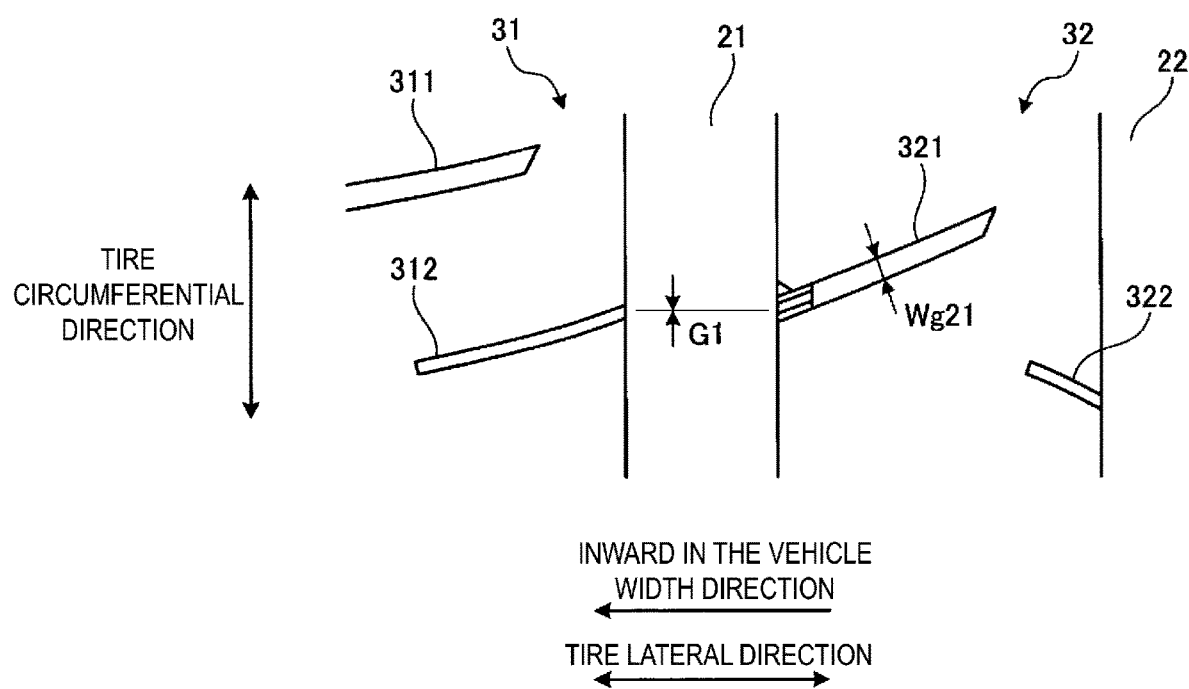
FIG. 13 is an explanatory diagram illustrating a modified example of the inner second lug groove illustrated in FIG. 4.

FIG. 13 is an explanatory diagram illustrating a modified example of the inner second lug groove illustrated in FIG. 4. In the drawing, constituents described in FIG. 4 have the same reference signs, and their explanations are omitted.

In the configuration of FIG. 4, the opening position of the inner shoulder sipe 312 and the opening position of the inner second lug groove 321 to the inner side shoulder main groove 21 are clearly offset in the tire circumferential direction.

However, no such limitation is intended, and the distance G1 in the tire circumferential direction between the opening position of the inner shoulder sipe 312 and the opening position of the inner second lug groove 321 to the inner side shoulder main groove 21 may have a relationship $0 \leq G1/Wg21 \leq 1.00$ to the width Wg21 of the inner second lug groove 321. In other words, the opening position of the inner second lug groove 321 may be disposed at the same position as the opening position of the inner shoulder sipe 312 in the tire circumferential direction.

Figure 14:
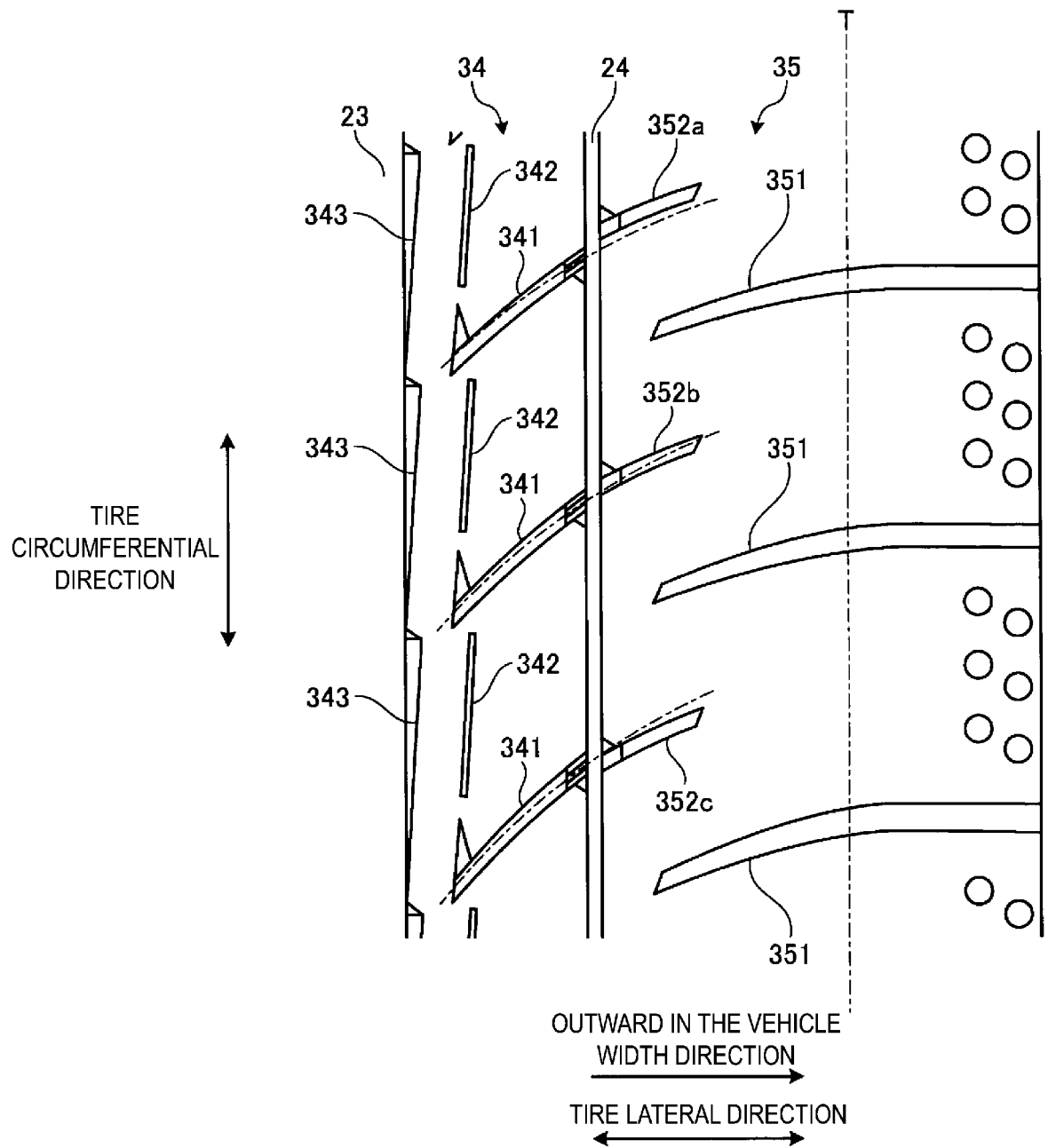
FIG. 14 is an explanatory diagram illustrating a modified example of the first outer shoulder lug grooves illustrated in FIG. 9.

FIG. 14 is an explanatory diagram illustrating a modified example of the first outer shoulder lug grooves illustrated in FIG. 9. In the drawing, constituents described in FIG. 9 have the same reference signs, and their explanations are omitted.

In the configuration of FIG. 9, as described above, all of the second outer shoulder lug grooves 352 are disposed offset to the extension lines of the bent lug grooves 341 in the tire circumferential direction, and are disposed offset in the same direction as the inclination direction of the groove center lines of the bent lug grooves 341. The distance G3 between the opening position of the second outer shoulder lug groove 352 and the opening position of the bent lug groove 341 to the circumferential narrow groove 24 in the tire circumferential direction is set in the above-described predetermined range. Such a configuration is preferable in that the pattern noise of the tire is reduced.

In contrast, in the configuration of FIG. 14, a plurality of second outer shoulder lug grooves 352a to 352c are disposed offset in different directions in the tire circumferential direction with respect to extension lines of the bent lug grooves 341. For example, in the configuration of FIG. 14, the second outer shoulder lug groove 352a on the upper stage in the drawing is disposed offset upward in the drawing to the extension line of the bent lug groove 341, a second outer shoulder lug groove 352b on the middle stage in the drawing is disposed on the extension line of the bent lug groove 341, and the second outer shoulder lug groove 352c on the lower stage in the drawing is disposed offset downward in the drawing to the extension line of the bent lug groove 341. In this manner, the plurality of second outer shoulder lug grooves 352a to 352c are disposed offset in the different directions with respect to the extension lines of the bent lug grooves 341, and thus the pattern noise is reduced. In such a configuration, the distance G3 between the opening position of the second outer shoulder lug groove 352 and the opening position of the bent lug groove 341 to the circumferential narrow groove 24 in the tire circumferential direction preferably has the relationship $0 \leq G3/Wg52 \leq 3.50$ to the width Wg52 of the second outer shoulder lug groove 352.

Effects

As described above, the pneumatic tire 10 includes the mounting direction indicator (not illustrated), the inner side shoulder main groove 21 and the inner side center main groove 22, the outer side center main groove 23, the circumferential narrow groove 24, and the five rows of the land portions 31 to 35. The mounting direction indicator indicates the mounting direction of the tire to the vehicle. The inner side shoulder main groove 21 and the inner side center main groove 22 are formed in the region inward in the vehicle width direction demarcated by the tire equatorial plane CL and extend in the tire circumferential direction. The outer side center main groove 23 is formed in the region outward in the vehicle width direction and extends in the tire circumferential direction. The circumferential narrow groove 24 is formed outward than the outer side center main groove 23 in the tire lateral direction and extends in the tire circumferential direction. The land portions 31 to 35 are formed by being defined by the four grooves 21 to 24 (see FIG. 2). Additionally, the groove opening portion of the inner side shoulder main groove 21 and the groove opening portion of the inner side center main groove 22 have the edge portions with the straight shape. The groove opening portion of the outer side center main groove 23 has the edge portion chamfered in the zigzag shape. The groove width Wg1 of the inner side shoulder main groove 21, the groove width Wg2 of the inner side center main groove 22, and the groove width Wg3 of the outer side center main groove 23 have the relationship Wg1<Wg3 and Wg2<Wg3.

In such a configuration, (1) the two main grooves 21, 22 are disposed in the region inward in the vehicle width direction, and one main groove 23 and one circumferential narrow groove 24 are disposed in the region outward in the vehicle width direction. Accordingly, the drainage properties of the region inward in the vehicle width direction having the high degree of contribution to wet performance is ensured and the rigidity of the region outward in the vehicle width direction having the high degree of contribution to the dry performance is ensured at the same time. Additionally, (2) the two main grooves 21, 22 in the region inward in the vehicle width direction have the straight shape. Meanwhile, the main groove 23 in the region outward in the vehicle width direction includes the zigzag-shaped chamfered portions 332, 343 (see FIGS. 6 and 9). Thus, the groove volume of the main groove 23 in the region outward in the vehicle width direction is relatively enlarged. This ensures the groove volume in the region outward in the vehicle width direction and ensures the wet performance of the tire. Additionally, (3) since the groove width Wg3 of the main groove 23 in the region outward in the vehicle width direction is larger than the groove widths Wg1, Wg2 of the two main grooves 21, 22 in the region inward in the vehicle width direction. This ensures the groove volume in the region outward in the vehicle width direction and ensures the wet performance of the tire. Accordingly, there is an advantage that the wet performance and the dry performance of the tire are appropriately provided in a compatible manner.

Additionally, in the pneumatic tire 10, the groove widths Wg1, Wg2, and Wg3 have the relationship $0.70 \leq Wg1/Wg3 \leq 0.90$ and $0.70 \leq Wg2/Wg3 \leq 0.90$. This has an advantage that the relationship between the groove widths Wg1, Wg2, and Wg3 of the main groove 21 to 23 is made appropriate.

Additionally, in the pneumatic tire 10, the groove widths Wg1, Wg2, and Wg3 have the relationship Wg1<Wg2<Wg3. This has an advantage that the relationship between the groove widths Wg1, Wg2, and Wg3 of the main groove 21 to 23 is made appropriate.

Additionally, in the pneumatic tire 10, the groove width Wg4 of the circumferential narrow groove 24 is in the range $0.10 \leq Wg4/Wg3 \leq 0.35$ to the groove width Wg3 of the outer side center main groove 23. This has an advantage that the groove width Wg4 of the circumferential narrow groove 24 is made appropriate.

Additionally, in the pneumatic tire 10, the groove width Wg4 and the groove depth Hg4 of the circumferential narrow groove 24 are in the range 1.5 mm≤Wg4≤4.0 mm and 5.0 mm≤Hg4≤7.5 mm. This has an advantage that the groove width Wg4 and the groove depth Hg4 of the circumferential narrow groove 24 are made appropriate.

Additionally, in the pneumatic tire 10, the groove width Wg4 and the groove depth Hg4 of the circumferential narrow groove 24 are in the range 3.0 mm≤Wg4 and 6.7 mm≤Hg4. This has an advantage that the groove width Wg4 and the groove depth Hg4 of the circumferential narrow groove 24 are made appropriate.

In the pneumatic tire 10, the distance Dg1 from the tire equatorial plane CL to the inner side shoulder main groove 21, the distance Dg2 from the tire equatorial plane CL to the inner side center main groove 22, and the distance Dg3 from the tire equatorial plane CL to the outer side center main groove 23 have the relationship $0.26 \leq Dg1/TW \leq 0.33$, $0.10 \leq Dg2/TW \leq 0.15$, and $0.10 \leq Dg3/TW \leq 0.15$ to the tire ground contact width TW. This has an advantage that the positional relationship between the main grooves 21 to 23 is made appropriate.

Additionally, in the pneumatic tire 10, the zigzag shape of the outer side center main groove 23 is constituted of the plurality of chamfered portions 332, 343 (see FIG. 8) formed in the edge portion of the groove opening portion, and the depth Hc of the chamfered portions 332, 343 has the relationship $0.30 \leq Hc/Hg3 \leq 0.50$ to the groove depth Hg3 of the outer side center main groove 23. There is an advantage that the lower limit improves the drainage properties of the outer side center main groove 23 and the upper limit ensures the rigidity of the center land portion 33.

Additionally, in the pneumatic tire 10, the land portion 34 defined by the outer side center main groove 23 and the circumferential narrow groove 24 includes the bent lug groove 341. The bent lug groove 341 extends from the circumferential narrow groove 24 inward in the tire lateral direction, bends in the hook shape in the tire circumferential direction, and terminates in the land portion 34 (see FIG. 2). Such a configuration has an advantage that the drainage properties of the region outward in the vehicle width direction can be ensured while the rigidity of the land portion 34 is ensured, compared to a configuration in which the land portion 34 includes through lug grooves (not illustrated).

Additionally, in the pneumatic tire 10, the land portion 31 outward in the tire lateral direction defined by the inner side shoulder main groove 21 includes the inner shoulder lug groove 311. The inner shoulder lug groove 311 extends from the tire ground contact edge T inward in the tire lateral direction and terminates in the inner shoulder land portion 31. The inner shoulder lug groove 311 is inclined at a predetermined inclination angle with respect to the tire circumferential direction. Additionally, the zigzag shape of the outer side center main groove 23 is formed by connecting the long portions and the short portions in alternation. Additionally, the inclination direction of the zigzag-shaped long portions with respect to the tire circumferential direction is the opposite direction to the inclination direction of the inner shoulder lug groove 311. Compared to a configuration in which both are inclined in the same direction, such a configuration has an advantage that the edge effect to both directions in the tire circumferential direction is ensured and the wet performance of the tire is improved.

Additionally, in the pneumatic tire 10, the land portion 33 defined by the inner side center main groove 22 and the outer side center main groove 23 includes the center lug groove 331. The center lug groove 331 extends from the inner side center main groove 22 toward the tire equatorial plane CL and terminates in the center land portion 33 without meeting the tire equatorial plane CL (see FIG. 2). Also, the distance D3 (see FIG. 7) between the terminating end portion of the center lug groove 331 and the tire equatorial plane CL is in the range 1.0 mm≤D3. This has an advantage that the wet performance and the pattern noise performance of the tire are balanced at high levels.

Additionally, in the pneumatic tire 10, the land portion 34 defined by the inner side center main groove 22 and the outer side center main groove 23 includes the plurality of center lug grooves 331. The center lug groove 331 extends from the inner side center main groove 22 toward the tire equatorial plane CL and terminates in the center land portion 33 (see FIG. 2). The pitch length P32 of the zigzag shapes of the outer side center main groove 23 has the relationship P31<P32 to the pitch length P31 of the plurality of center lug grooves 331. This has an advantage that the pattern noise is reduced.

Additionally, in the pneumatic tire 10, the inner second land portion 32 includes the inner second sipes 322. The inner second sipe 322 extends outward in the tire lateral direction from the inner side center main groove 22 and terminates in the inner second land portion 32. The center land portion 33 includes the center lug groove 331 (or the chamfered sipe 331', see FIG. 12). The center lug groove 331 extends from the inner side center main groove 22 toward the tire equatorial plane CL and terminates in the center land portion 33 (see FIG. 6). In such a configuration, compared to a configuration where both are sipes, the drainage properties of the region inward in the vehicle width direction of the tread are improved, and the wet performance of the tire is improved. Additionally, compared to a configuration in which both are lug grooves, the rigidity of the region inward in the vehicle width direction of the tread is ensured and the dry performance of the tire is improved. This has an advantage that the wet performance and the dry performance of the tire are provided in a compatible manner.

Additionally, in the pneumatic tire 10, all of the center lug grooves 331 are disposed offset in the same direction in the tire circumferential direction with respect to the extension lines of the inner second sipes 322 (see FIG. 3). This has an advantage that the pattern noise of the tire is reduced.

Additionally, in the pneumatic tire 10, the land portion 31 outward in the tire lateral direction defined by the inner side shoulder main groove 21 is a rib having a road contact surface continuous in the tire circumferential direction (see FIG. 3). This has an advantage that the rigidity of the inner shoulder land portion 31 is ensured and the dry performance of the tire is improved.

EXAMPLE

FIGS. 15A-15B include a table showing the results of performance tests of pneumatic tires according to embodiments of the technology.

The performance test evaluated for (1) dry steering stability performance, (2) wet steering stability performance, and (3) uneven wear resistance performance of a plurality of types of test tires. The test tires having a tire size of 215/45R17 are mounted on rims having a rim size of 17×7 J, and an internal pressure of 240 kPa and a load specified by JATMA are applied to the test tires. The test tires are mounted on all wheels of a rear-wheel drive hybrid vehicle as a test vehicle having an engine displacement of 2.5 L.

(1) In the evaluation for dry steering stability performance, the test vehicle runs on a test course of dry road surfaces including a flat circuit at from 60 km/h to 100 km/h. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable.

(2) In the evaluation for wet steering stability performance, the test vehicle runs at 40 km/h on an asphalt road on which water is sprinkled at a water depth of 1.0 mm. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable.

(3) In the evaluation for uneven wear resistance performance, the test vehicle runs a paved road at 10000 km. Subsequently, a difference in amount of wear occurred in the respective land portions is measured for evaluation. Results of the evaluation are expressed as index values and evaluated with the Conventional Example being assigned as the reference (100). In this evaluation, larger values are preferable.

The test tires of Examples 1 to 8 have the configuration of FIGS. 1 and 2. The outer side center main groove 23 has the zigzag shape. The groove widths Wg1, Wg2, and Wg3 of the main grooves 21 to 23 have the relationship Wg1<Wg3 and Wg2<Wg3. In addition, the groove depths Hg1 to Hg3 of the main grooves 21 to 23 are 8.0 mm, and the groove depth Hg4 of the circumferential narrow groove 24 is 6.0 mm. The width Wc of the chamfered portions 332, 343 of the outer side center main groove 23 is 2.0 mm. Additionally, the tire ground contact width TW is TW=160 mm, the ground contact width W1 of the inner shoulder land portion 31, the ground contact width W2 of the inner second land portion 32, and the ground contact width W3 of the center land portion 33 are W1=29.0 mm, W2=23.0 mm, and W3=24.0 mm, respectively.

The test tire of Conventional Example includes the outer side center main groove 23 having a straight shape and the main grooves 21 to 23 having the same groove width in the test tires of Example 1.

As shown in the test results, it has been found that the test tires of Examples 1 to 8 provide dry steering stability performance, wet steering stability performance, and uneven wear resistance performance of the tire in a compatible manner.

The invention claimed is:

1. A pneumatic tire comprising:
a mounting direction indicator that indicates a mounting direction of the tire to a vehicle;
an inner side shoulder main groove and an inner side center main groove that are formed in a region inward in a vehicle width direction demarcated by a tire equatorial plane and extend in a tire circumferential direction;
an outer side center main groove that is formed in a region outward in the vehicle width direction and extends in the tire circumferential direction;
a circumferential narrow groove that is formed outward than the outer side center main groove in a tire lateral direction and extends in the tire circumferential direction;
five rows of land portions formed by being defined by the inner side shoulder main groove, the inner side center main groove, the outer side center main groove and the circumferential narrow groove;
the five rows of land portions including an inner shoulder land portion defined by the inner side shoulder main groove and located outward of the inner side shoulder main groove in the tire lateral direction, the inner shoulder land portion being an outermost land portion in the tire lateral direction and being located on a tire ground contact edge, the inner shoulder land portion being a continuous rib in the tire circumferential direction, the inner shoulder land portion being undivided in the tire circumferential direction by grooves, the inner shoulder land portion being undivided in the tire lateral direction by grooves, the inner shoulder land portion being undivided in the tire circumferential direction by sipes, and the inner shoulder land portion being undivided in the tire lateral direction by sipes;
a groove opening portion of the inner side shoulder main groove and a groove opening portion of the inner side center main groove having edge portions with a straight shape, the groove opening portion of the outer side center main groove having an edge portion chamfered in a zigzag shape;
a groove width $Wg1$ of the inner side shoulder main groove, a groove width $Wg2$ of the inner side center main groove, and a groove width $Wg3$ of the outer side center main groove having a relationship $Wg1<Wg3$ and $Wg2<Wg3$;
a groove width $Wg4$ of the circumferential narrow groove being in a range $0.10 \leq Wg4/Wg3 \leq 0.35$ to the groove width $Wg3$ of the outer side center main groove; and
the groove width $Wg4$ and a groove depth $Hg4$ of the circumferential narrow groove being in a range 1.5 mm$\leq Wg4 \leq 3.8$ mm and 5.0 mm$\leq Hg4 \leq 7.5$ mm.

2. The pneumatic tire according to claim 1, wherein the groove widths $Wg1$, $Wg2$, and $Wg3$ have a relationship $0.70 \leq Wg1/Wg3 \leq 0.90$ and $0.70 \leq Wg2/Wg3 \leq 0.90$.

3. The pneumatic tire according to claim 1, wherein the groove widths $Wg1$, $Wg2$, and $Wg3$ have a relationship $Wg1<Wg2<Wg3$.

4. The pneumatic tire according to claim 1, wherein the groove width $Wg4$ and the groove depth $Hg4$ of the circumferential narrow groove are in a range 3.0 mm$\leq Wg4$ and 6.7 mm$\leq Hg4$.

5. The pneumatic tire according to claim 1, wherein a distance $Dg1$ from the tire equatorial plane to the inner side shoulder main groove, a distance $Dg2$ from the tire equatorial plane to the inner side center main groove, and a distance $Dg3$ from the tire equatorial plane to the outer side center main groove have a relationship $0.26 \leq Dg1/TW \leq 0.33$, $0.10 \leq Dg2/TW \leq 0.15$, and $0.10 \leq Dg3/TW \leq 0.15$ to a tire ground contact width TW.

6. The pneumatic tire according to claim 1, wherein the zigzag shape of the outer side center main groove is constituted of a plurality of chamfered portions formed in the edge portion of the groove opening portion, and a depth $Hc$ of the chamfered portions has a relationship $0.30 \leq Hc/Hg3 \leq 0.50$ to a groove depth $Hg3$ of the outer side center main groove.

7. The pneumatic tire according to claim 1, wherein the land portion defined by the outer side center main groove and the circumferential narrow groove includes a bent lug groove, and the bent lug groove extends from the circumferential narrow groove inward in the tire lateral direction, bends in a hook shape in the tire circumferential direction, and terminates in the land portion.

8. The pneumatic tire according to claim 1, wherein the land portion outward in the tire lateral direction defined by the inner side shoulder main groove includes an inner shoulder lug groove, the inner shoulder lug groove extends from a tire ground contact edge inward in the tire lateral direction and terminates in an inner shoulder land portion, and the inner shoulder lug groove is inclined at a predetermined inclination angle with respect to the tire circumferential direction,
the zigzag shape of the outer side center main groove is formed by connecting long portions and short portions in alternation, and
an inclination direction of the long portions of the zigzag shape with respect to the tire circumferential direction is an opposite direction to an inclination direction of the inner shoulder lug groove.

9. The pneumatic tire according to claim 1, wherein the land portion defined by the inner side center main groove and the outer side center main groove includes a center lug groove, and the center lug groove extends from the inner side center main groove toward the tire equatorial plane and terminates in a center land portion without meeting the tire equatorial plane, and
a distance $D3$ between a terminating end portion of the center lug groove and the tire equatorial plane is in a range 1.0 mm$<D3$.

10. The pneumatic tire according to claim 1, wherein the land portion defined by the inner side center main groove and the outer side center main groove includes a plurality of center lug grooves, and the center lug groove extends from the inner side center main groove toward the tire equatorial plane and terminates in a center land portion, and
a pitch length $P32$ of the zigzag shapes of the outer side center main groove has a relationship $P31<P32$ to a pitch length $P31$ of the plurality of center lug grooves.

11. The pneumatic tire according to claim 1, wherein the five rows of land portions include:
an inner second land portion which includes inner second sipes, the inner second sipes extending outward in the tire lateral direction from the inner side center main groove and terminating in the inner second land portion, and a center land portion defined between the inner side center main groove and the outer side center main groove which includes center lug grooves, the center lug grooves extending from the inner side center main groove toward the tire equatorial plane and terminating in the center land portion.

12. The pneumatic tire according to claim 11, wherein all of the center lug grooves are disposed offset in a same direction in the tire circumferential direction with respect to extension lines of the inner second sipes.

13. A pneumatic tire comprising:

a mounting direction indicator that indicates a mounting direction of the tire to a vehicle;

an inner side shoulder main groove and an inner side center main groove that are formed in a region inward in a vehicle width direction demarcated by a tire equatorial plane and extend in a tire circumferential direction;

an outer side center main groove that is formed in a region outward in the vehicle width direction and extends in the tire circumferential direction;

a circumferential narrow groove that is formed outward than the outer side center main groove in a tire lateral direction and extends in the tire circumferential direction;

five rows of land portions formed by being defined by the inner side shoulder main groove, the inner side center main groove, the outer side center main groove and the circumferential narrow groove;

a groove opening portion of the inner side shoulder main groove and a groove opening portion of the inner side center main groove having edge portions with a straight shape, the groove opening portion of the outer side center main groove having an edge portion chamfered in a zigzag shape; and a groove width Wg1 of the inner side shoulder main groove, a groove width Wg2 of the inner side center main groove, and a groove width Wg3 of the outer side center main groove having a relationship Wg1<Wg3 and Wg2<Wg3; wherein the land portion defined by the inner side center main groove and the outer side center main groove includes a plurality of center lug grooves, and the center lug groove extends from the inner side center main groove toward the tire equatorial plane and terminates in a center land portion; and a pitch length P32 of the zigzag shapes of the outer side center main groove has a relationship P31<P32 to a pitch length P31 of the plurality of center lug grooves.

14. A pneumatic tire comprising:

a mounting direction indicator that indicates a mounting direction of the tire to a vehicle;

an inner side shoulder main groove and an inner side center main groove that are formed in a region inward in a vehicle width direction demarcated by a tire equatorial plane and extend in a tire circumferential direction;

an outer side center main groove that is formed in a region outward in the vehicle width direction and extends in the tire circumferential direction;

a circumferential narrow groove that is formed outward than the outer side center main groove in a tire lateral direction and extends in the tire circumferential direction;

five rows of land portions formed by being defined by the inner side shoulder main groove, the inner side center main groove, the outer side center main groove and the circumferential narrow groove;

a groove opening portion of the inner side shoulder main groove and a groove opening portion of the inner side center main groove having edge portions with a straight shape, the groove opening portion of the outer side center main groove having an edge portion chamfered in a zigzag shape; and a groove width Wg1 of the inner side shoulder main groove, a groove width Wg2 of the inner side center main groove, and a groove width Wg3 of the outer side center main groove having a relationship Wg1<Wg3 and Wg2<Wg3; wherein the land portion outward in the tire lateral direction defined by the inner side shoulder main groove is a rib having a road contact surface continuous in the tire circumferential direction.

15. A pneumatic tire comprising:

a mounting direction indicator that indicates a mounting direction of the tire to a vehicle;

an inner side shoulder main groove and an inner side center main groove that are formed in a region inward in a vehicle width direction demarcated by a tire equatorial plane and extend in a tire circumferential direction;

an outer side center main groove that is formed in a region outward in the vehicle width direction and extends in the tire circumferential direction;

a circumferential narrow groove that is formed outward than the outer side center main groove in a tire lateral direction and extends in the tire circumferential direction;

five rows of land portions formed by being defined by the inner side shoulder main groove, the inner side center main groove, the outer side center main groove and the circumferential narrow groove;

the five rows of land portions include an outer shoulder land portion defined by the circumferential narrow groove and located outward in the tire lateral direction of the circumferential narrow groove, the outer shoulder land portion being an outermost land portion in the tire lateral direction and being located on a tire ground contact edge;

a groove opening portion of the inner side shoulder main groove and a groove opening portion of the inner side center main groove having edge portions with a straight shape, the groove opening portion of the outer side center main groove having an edge portion chamfered in a zigzag shape; and a groove width Wg1 of the inner side shoulder main groove, a groove width Wg2 of the inner side center main groove, and a groove width Wg3 of the outer side center main groove having a relationship Wg1<Wg3 and Wg2<Wg3; wherein the outer shoulder land portion is a rib having a road contact surface continuous in the tire circumferential direction, the inner shoulder land portion being undivided in the tire circumferential direction by grooves, the inner shoulder land portion being undivided in the tire lateral direction by grooves, the inner shoulder land portion being undivided in the tire circumferential direction by sipes, and the inner shoulder land portion being undivided in the tire lateral direction by sipes.

* * * * *